United States Patent
Kawatsuki et al.

(10) Patent No.: US 6,696,114 B1
(45) Date of Patent: Feb. 24, 2004

(54) ALIGNMENT LAYER AND A LIQUID CRYSTAL DISPLAY USING THE SAME

(75) Inventors: Yoshihiro Kawatsuki, Himeji (JP); Takeya Sakai, Nagoya (JP); Masao Uetsuki, Nagoya (JP)

(73) Assignee: Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 09/484,698

(22) Filed: Jan. 18, 2000

(30) Foreign Application Priority Data

| Jan. 19, 1999 | (JP) | 11-009997 |
| Mar. 19, 1999 | (JP) | 11-074898 |
| Aug. 6, 1999 | (JP) | 11-223916 |
| Aug. 30, 1999 | (JP) | 11-242421 |
| Oct. 22, 1999 | (JP) | 11-300455 |

(51) Int. Cl.$^7$ .................. G02F 1/1337; C09K 19/56
(52) U.S. Cl. .................. 428/1.2; 349/123; 349/124; 349/127; 349/129; 349/136
(58) Field of Search .................. 428/1.2; 349/123, 349/124, 129, 136, 127

(56) References Cited

U.S. PATENT DOCUMENTS

| 6,001,277 A | * | 12/1999 | Ichimura et al. ......... 252/299.4 |
| 6,025,900 A | * | 2/2000 | Yoon et al. ................ 349/124 |
| 6,226,066 B1 | * | 5/2001 | Reznikov et al. .......... 349/124 |

OTHER PUBLICATIONS

Ichimura et al, WO96/37807, Nov. 28, 1996, Abstract in English.*

* cited by examiner

Primary Examiner—Harold Pyon
Assistant Examiner—Sow-Fun Hon
(74) Attorney, Agent, or Firm—Sughrue Mion, PLLC

(57) ABSTRACT

An alignment layer is obtained by applying a polymer having a mesogen structure onto a substrate and irradiating this applied polymer with ultraviolet light. According to the invention, there can be provided an alignment layer capable of conferring alignment functions on liquid crystals by a non-rubbing treating means in a simple optical alignment device without generating fine dusts or causing an electric discharge by static electricity, as well as a liquid crystal display using the same.

3 Claims, 7 Drawing Sheets

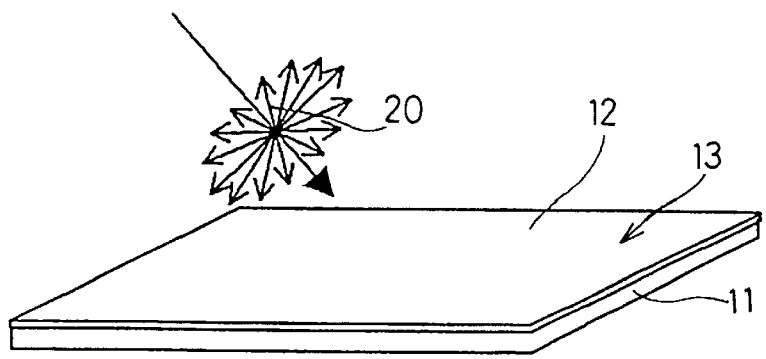
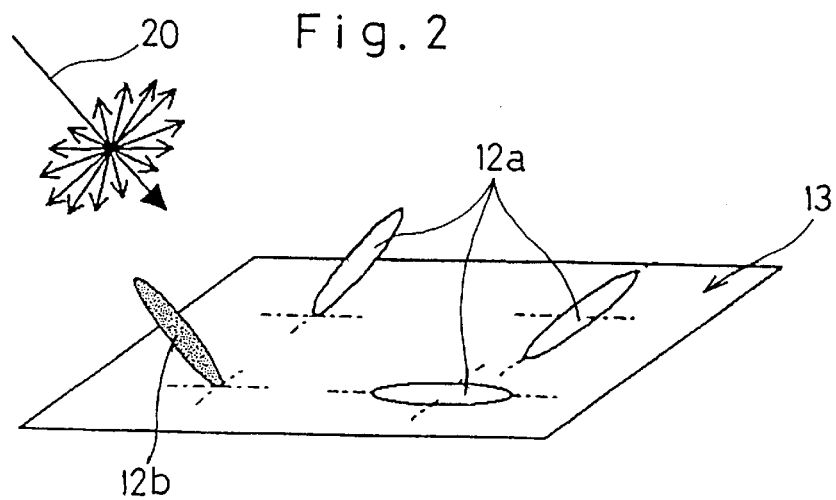

ALIGNMENT LAYER AND A LIQUID CRYSTAL DISPLAY USING THE SAME

BACKGROUND OF THE INVENTION

1. (Field of the Invention)

The present invention relates to an alignment layer capable of conferring alignment functions on liquid crystals by a non-rubbing treating means using a simple optical alignment device and to a liquid crystal display using such alignment layer.

2. (Description of the Related Art)

A liquid crystal cell has a pair of glass substrates confronting to each other and an alignment layer disposed on an inner surface of each substrate to give alignment to liquid crystal molecules charged between the substrates. As conventional typical processes for manufacturing an alignment layer, the following 2 processes are known. In the first process as shown in FIG. 14, a photosensitive polymer 52 such as polyimide is applied onto a substrate 51, and its surface is rubbed with a rubbing drum 53 having a nylon or polyester fiber-planted cloth wound on it, whereby very fine grooves are formed on the surface of the polymer 52. The second process is a SiO slanting deposition process in which silicon oxide (SiO) is vapor deposited in a slanting direction onto a substrate.

In the first process, however, fine dusts are generated or an electric discharge occurs due to static electricity upon rubbing the surface of polymer 52 with the rubbing drum 53, thus causing inconvenience in producing liquid crystal panels. In the second process, an angle of deposition to a substrate as well as the uniformity of layer thickness is difficult to maintain, and further a manufacturing device of large scale is required.

Under these circumstances, the present inventors proposed an alignment layer for liquid crystal displays (also referred to hereinafter as LCD) using a polymer whose photo-reaction is selectively induced by irradiation with linear polarized ultraviolet light (also referred to hereinafter as linear polarized light), as well as a process for producing the same (JP-A-10-87859). This polymer makes use of that shown in the following chemical formula C60:

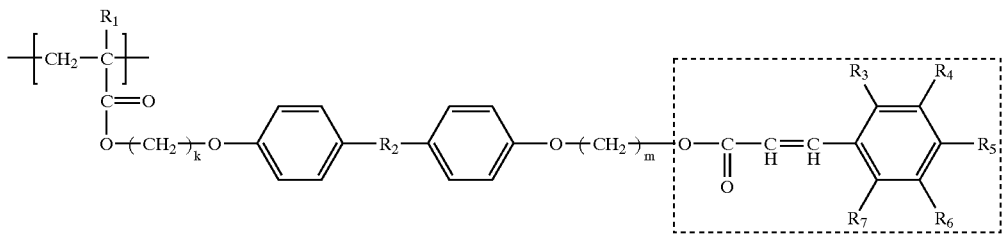

wherein—$R_1$=—$CnH_{2n+1}$(n=0 to 5), k=1 to 12, m=1 to 12; $R_2$=none, —COO, —OCO—, —N=N—, —CH=CH— or —$C_6H_4$—; and —$R_3$ to $R_7$=—H, halogen group or alkyloxy group such as methoxy group. Further, the portion surrounded by the broken line is a cinnamate group or its derivative.

In the case of the alignment layer described above, however, it is necessary to convert natural light directly into linear polarized light with which the polymer is to be irradiated. As a dichroic polarizer used in such conversion into polarized light, a sheet prepared generally by primarily drawing PVA (polyvinyl alcohol), then impregnated it with I(iodine) and sandwiching it between TAC (triacetyl cellulose) is known. However, this dichroic polarizer is poor not only in transmittance in the UV range but also in thermostability, so it cannot be used as an optical alignment device. For this reason, a birefringence-type prism is used to polarize light in the UV range. However, since the birefringence-type prism makes use of a natural crystal of calcite as the prism, it is difficult to obtain a large prism through which the whole area of a substrate used in LCD is irradiated with light. Furthermore, when this prism is used, a optical alignment device is rendered complicated and large.

SUMMARY OF THE INVENTION

Accordingly, the object of the present invention is to provide an alignment layer capable of conferring alignment functions on liquid crystals by a non-rubbing treating means in a simple optical alignment device without generating fine dusts or causing an electric discharge by static electricity, as well as a liquid crystal display using the same.

To accomplish the object described above, the alignment layer according to the first aspect of the invention is obtained by applying onto a substrate a polymer having side chains with a mesogen structure and irradiating this applied polymer with ultraviolet light. This mesogen structure is a structure having a group capable of forming liquid crystals.

The alignment layer according to the second aspect of the invention is obtained by applying onto a substrate a polymer shown in formula C4 with side chains having at least one of the mesogen structures shown in formulae C1 to C3 and with the main chain being at least one of homopolymers or copolymers of hydrocarbon, acrylate, methacrylate and siloxane, and irradiating this applied polymer with non-polarized ultraviolet light.

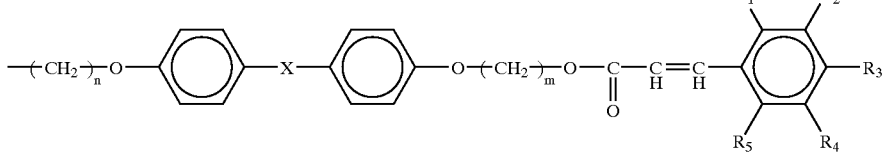

-continued

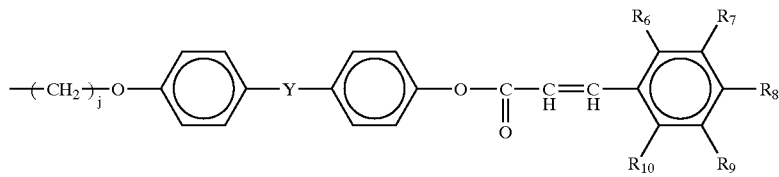
C2

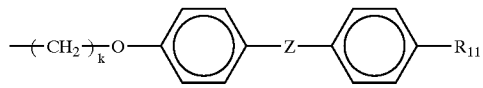
C3

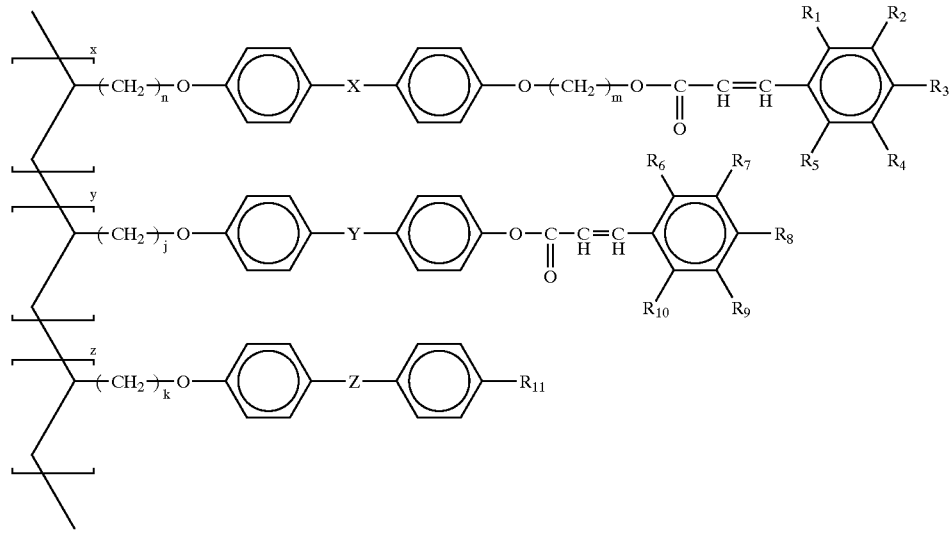
C4

In formula C1 to C4, x:y:z=100 to 0:100 to 0:99 to 0 whereupon x+y+z=100; n=1 to 12, m=1 to 12, j=1 to 12, k=1 to 12; X, Y, Z=none, —COO, —OCO—, —N=N—, —C=C— or —$C_6H_4$—; —$R_1$ to $R_{10}$=—H, halogen group, or alkyloxy group such as methoxy group, and —$R_{11}$=—H, —CN, or alkyloxy group such as methoxy group.

This branched-chain polymer has at least one substituent group such as biphenyl, terphenyl, phenyl benzoate and azobenzene as a mesogen component in the side chains thereof, and hydrocarbons, acrylates, methacrylates and cyclohexane in the main chain. As necessary, the polymer can have a structure having photosensitive groups such as cinnamate group or its derivatives added to the mesogen component in the side chains, or a structure to which side chains having and not having photosensitive groups are added together at a predetermined proportion.

The alignment layer described above is obtained easily by applying the polymer onto a substrate and irradiating it with natural light (also referred to hereinafter as non-polarized light). That is, by irradiating the polymer with natural light, the side chains in the polymer are crosslinked with one another (dimerization) to form an alignment layer indicating a pre-tilt angle when used for liquid crystals. Further, since the alignment layer in the first and second aspects of the present invention is obtained by the use of natural light, a polarizer such as birefringence-type prism is not necessary. Accordingly, the optical alignment device can be simplified to form the alignment layer easily. Then, this alignment layer can be used effectively in liquid crystal displays.

Furthermore, by controlling the direction and amount of irradiation of light, it is possible to arbitrarily set the direction of alignment of liquid crystal molecules and the degree of the pre-tilt angle in the alignment layer. Accordingly, the product can be used as an alignment layer in various liquid crystal displays in e.g. TN, VA and IPS modes.

Furthermore, by partial irradiation through a mask, an alignment layer with different pre-tilt angles and alignment directions can be formed on the same substrate. In particular, the expression of a state of alignment of liquid crystal molecules with low and high pre-tilt angles in 1 picture element or the picture-dividing alignment of inverting the alignment of liquid crystal molecules in 1 picture element is an effective means for enlarging a viewing angle in liquid crystal displays. According to the first and second aspects of the invention described above, the picture-dividing alignment is feasible, thus enlarging the viewing angle of a liquid crystal display. Furthermore, the present invention is advantageous for production of liquid crystal displays because fine dusts or an electric discharge due to static electricity upon physical rubbing of the surface of a polymer with a rubbing drum do not occur, and a large manufacturing device is not necessary.

The alignment layer according to the third aspect of the invention is obtained by applying onto a substrate a polymer having at least one of the photosensitive groups shown in formulae C11 to C14 and irradiating the photosensitive groups shown in formulae C11 to C14 and irradiating this applied polymer with non-polarized, linear polarized or partially polarized ultraviolet light. Here, the term "partially polarized" refers to a state of low degrees of polarization as a whole in which a completely linear polarized component and a non-polarized component are present together, and this partially polarized light can be obtained by the use of the device shown in FIG. 11 below.

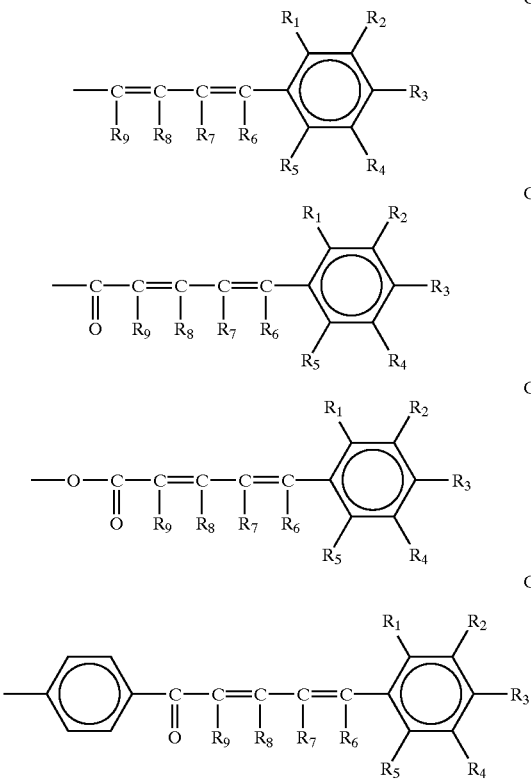

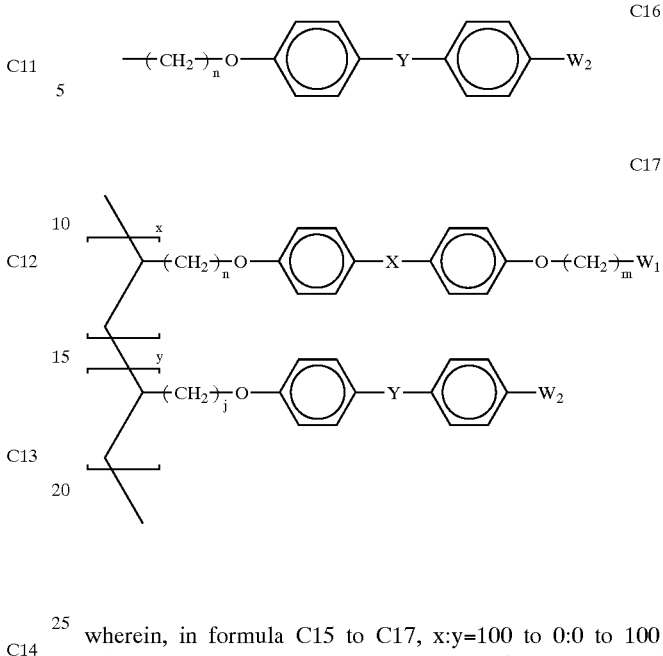

wherein, in formulae C11 to C14, —$R_1$ to $R_5$=—H, halogen group, or alkyloxy group such as methoxy group; —$R_6$ to $R_9$=—H, —CN, phenyl group, phenoxy group, alkyl group such as methyl group or alkyloxy group such as methoxy group.

In a preferred embodiment of the third aspect of the invention, the orientation film is obtained by applying onto a substrate a homopolymer or having at least one of the structures $W_1$ and $W_2$ shown in formulae C11 to C14 above and with the main chain being at least one of hydrocarbon, acrylate, methacrylate and siloxane, and irradiating this applied polymer with non-polarized, linear polarized or partially polarized ultraviolet light.

wherein, in formula C15 to C17, x:y=100 to 0:0 to 100 whereupon x+y=100; n=1 to 12, m=1 to 12, j=1 to 12; X and Y=none, —COO, —OCO—, —N=N—, —C=C— or —$C_6H_4$—; and $W_1$ and $W_2$ are the same as shown in formulae C11 to C14.

According to the third aspect of the invention described above, the polymer contains cinnamylidene (or its derivative), and this polymer is applied onto a substrate and irradiated with non-polarized, linear polarized or partially polarized ultraviolet light whereby the crosslinking reaction (dimerization reaction) accompanied by formation of a cyclobutane linkage as shown in reaction formula C18 below is generated when the polymer of formula C13 above (—$R_1$ to $R_9$=—H) is used, and a good alignment layer indicating a pre-tilt angle upon conversion into liquid crystals is thus obtained. Because this alignment layer can be obtained by irradiation with natural light, no special polarizer is necessary and the optical alignment device can be simplified to form the alignment layer easily. Further, even if linear polarized ultraviolet light is used, the alignment layer can be easily obtained in a short time by using low irradiation energy i.e. a small source of irradiation, and accordingly, the optical alignment device can be simplified. Then, this alignment layer can be used effectively in a liquid crystal display. Further, since this alignment layer can be obtained by a non-rubbing means, neither fine dusts upon formation of the layer nor an electric discharge due to static electricity occurs. This is advantageous for production of liquid crystal panels.

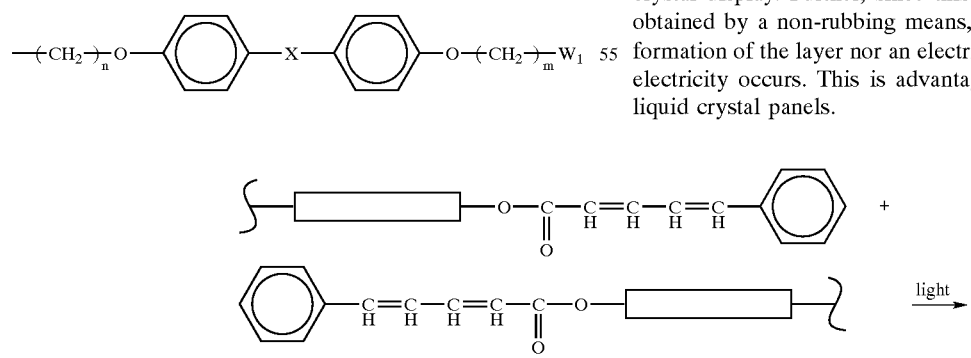

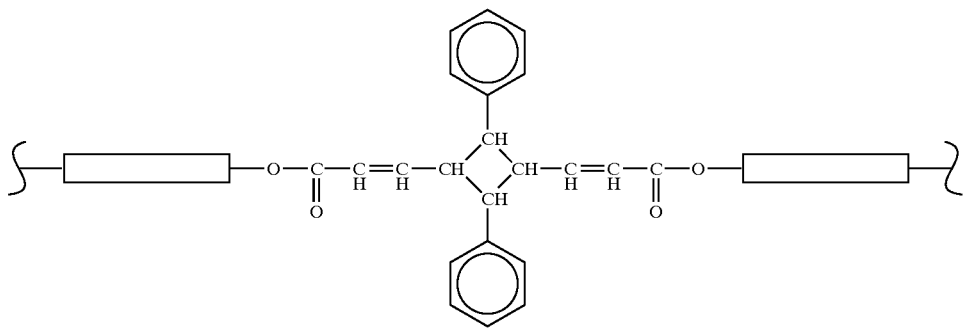

The rectangular portion shown in reaction formula C18 indicates a molecular chain containing a mesogen component through which the main chain of the polymer binds to its side chain.

The alignment layer according to the fourth aspect of the invention is obtained by applying onto a substrate a polymer having at least one of the structures shown in formulae C31 to C34 and irradiating this applied polymer with non-polarized, linear polarized or partially polarized ultraviolet light.

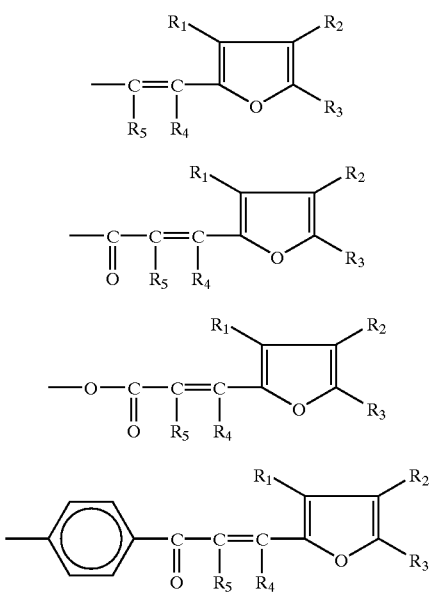

wherein, in formulae C31 to C34, —$R_1$ to $R_3$=—H, halogen group, or alkyloxy group such as methoxy group; and —$R_4$ and $R_5$=—H, —CN, or alkyloxy group such as methoxy group.

In a preferred embodiment of the fourth aspect of the invention, the alignment layer is obtained by applying onto a substrate a homopolymer or copolymer shown in formula C37 with side chains of a structure shown in formula C35 or C36 having at least one of the structures $W_3$ and $W_4$ shown in formulae C31 to C34 above and with the main chain being at least one of hydrocarbon, acrylate, methacrylate and siloxane, and irradiating this applied polymer with non-polarized, linear polarized or partially polarized ultraviolet light.

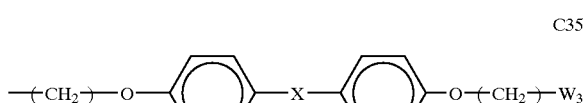

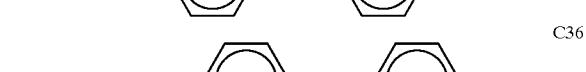

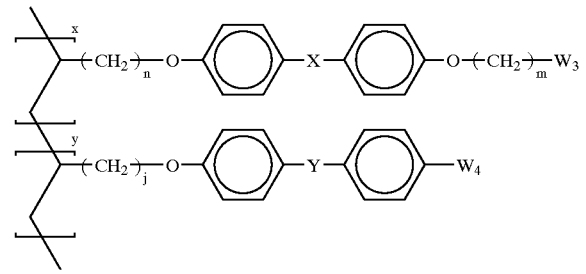

wherein, in formula C35 to C37, x:y=100 to 0:0 to 100 whereupon x+y=100; n=1 to 12, m=1 to 12, j=1 to 12; X and Y=none, —COO, —OCO—, —N=N—, —C=C— or —$C_6H_4$—; and $W_3$ and $W_4$ are the same as shown in formulae C31 to C34.

In the fourth aspect of the invention described above, the polymer contains a mesogen component and a photosensitive group such as β-(2-furyl)acryloyl (or its derivative) group. When this polymer is applied to a substrate and irradiated with non-polarized (natural light), linear polarized or partially polarized ultraviolet light, the β-(2-furyl) acryloyl group undergoes crosslinking reaction accompanied by formation of a cyclobutane linkage as shown in reaction formula C38 below, and a good alignment layer indicating a pre-tilt angle upon conversion into liquid crystals is thus obtained. Because this alignment layer can be obtained by irradiation with natural light, the optical alignment device can be simplified to form the alignment layer easily. Further, even if linear polarized ultraviolet light is used, the alignment layer can be easily obtained in a short time by using low irradiation energy i.e. a small source of irradiation, and accordingly, the optical alignment device can be simplified. Further, since this alignment layer can be obtained by a non-rubbing means, neither fine dusts upon formation of the layer nor an electric discharge due to static electricity occurs. Furthermore, this alignment layer can also be used effectively in a liquid crystal display.

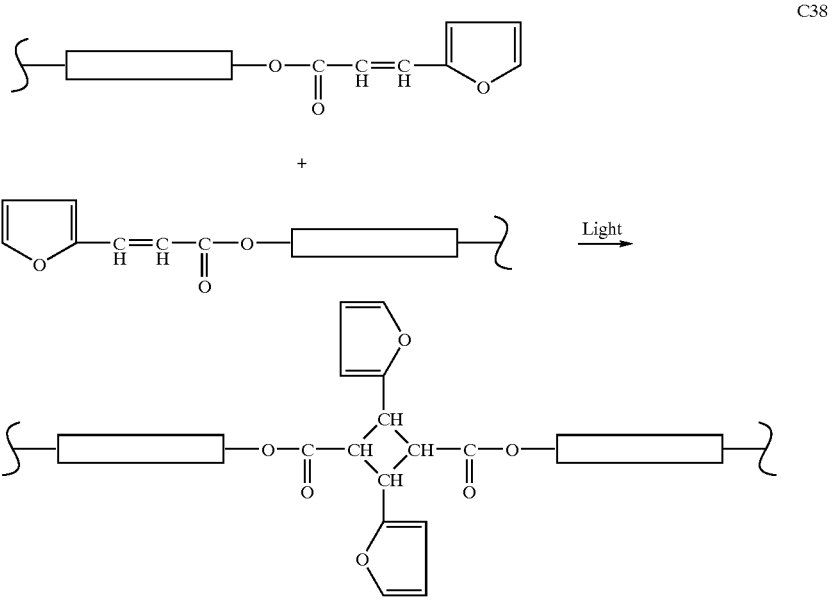

C38

The rectangular portion shown in the reaction formula C38 is a molecular chain containing a mesogen component through which the main chain of the polymer is bound to its side chain.

The alignment layer according to the fifth aspect of the invention is obtained by applying a homopolymer or copolymer having at least one of the structures shown in formulae C41 and C42 onto a substrate, and irradiating this applied polymer with linear polarized or partially polarized ultraviolet light.

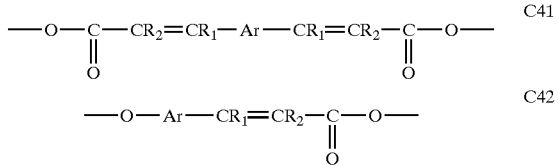

wherein, in formulae C41 and C42, Ar is p- or m-phenylene groups and/or p- or m-biphenylene groups substituted at the para- or meta-position; and $R_1$ and $R_2$ are hydrogen group, methyl group and/or nitrile group.

The alignment layer according to the sixth aspect of the invention is obtained by applying a homopolymer or copolymer having at least one of the structures shown in formulae C43 to C46 onto a substrate, and irradiating this applied polymer with linear polarized or partially polarized ultraviolet light.

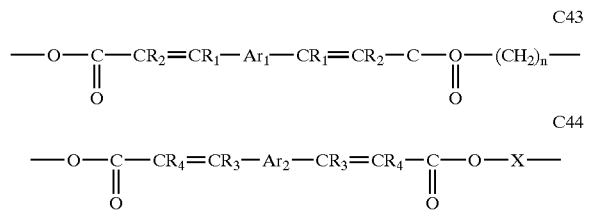

-continued

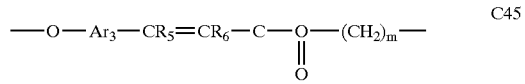

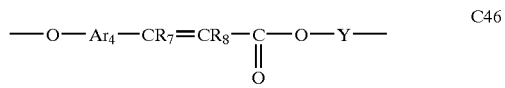

wherein, in formulae C43 to C46, $Ar_1$ to $Ar_4$ are p- or m-phenylene groups and/or p- or m-biphenylene groups substituted at the para- or meta-position; $R_1$ to $R_8$ are hydrogen group, methyl group and/or nitrile group; X and Y are aliphatic polyester, aliphatic polyether and/or aliphatic polycarbonate; and n=1 to 12, m=1 to 12.

In a preferred embodiment of the sixth aspect of the invention, the alignment layer is obtained by applying a copolymer containing both a component having at least one of the structures shown in formulae C43 to C46 and a component consisting of polyalkylene oxide onto a substrate, and irradiating this applied polymer with linear polarized ultraviolet light.

The polymers used in the fifth and sixth aspects of the invention can be synthesized by coupling of an aromatic acid component having a photo-crosslinking unsaturated bond, a polyether having reactive groups at both the terminals thereof, aliphatic polyester, aliphatic polycarbonate, or a long-chain alkylene component. The basic method for this synthesis can make use of melt polycondensation, solution polycondensation or interfacial polycondensation.

It is necessary that the polymers described above should contain double bonds for photo-crosslinking to express the alignment of liquid crystals. Accordingly, p- or m-phenylene bis(acrylic acid), p- or m-phenylene bis(cyanobutadiene carboxylic acid), p- or m-phenylene bis(cyanoacrylic acid), 4- or 3-hydroxy cinnamic acid, p- or m-biphenylene bis (acrylic acid), p- or m-biphenylene bis(cyanobutadiene carboxylic ccid), p- or m-biphenylene bis(cyanoacrylic acid) etc. are used.

As the component for improving layer formability (polyalkylene oxides) include hydroxyl-terminated polyalkylene glycols such as polyethylene glycol, polypropylene glycol, polytetramethylene glycol, and propylene oxide to ethylene oxide copolymer-based glycols, amino-terminated polyalkylene oxides such as polyethylene oxide, polypropylene oxide, polytetramethylene oxide, and propylene oxide to ethylene oxide copolymers, and the polyester-type component includes aliphatic polyesters such as polyalkyl adipate, polyalkylene octanoate and polyalkylene sebacate, as well as aliphatic polycarbonates.

The polymer described above is applied onto a substrate and then irradiated with linear polarized or partially polarized light whereby the aromatic acid component having a photo-crosslinking unsaturated bond undergoes the photo-crosslinking reaction shown in the following reaction formula C47, thus readily giving an alignment layer excellent in thermostability. This alignment layer can be obtained by the same non-rubbing treating means as for each preceding aspect of the invention. In addition, even though linear polarized light is used, the alignment layer can be obtained in a short time by using low irradiation energy i.e. a small source of irradiation, and accordingly, the optical alignment device can be simplified to form the alignment layer easily. Furthermore, this alignment layer can also be used effectively in liquid crystal displays.

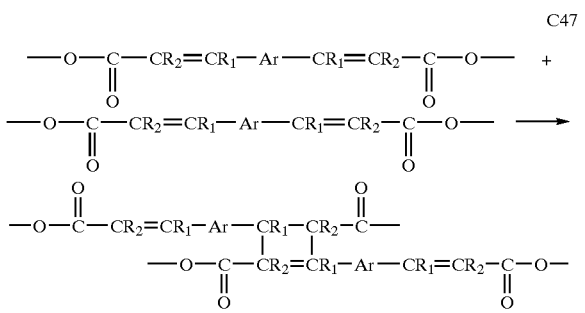

C47

The alignment layer according to the seventh aspect of the invention is obtained by irradiating a light-alignment polymer applied onto a substrate with partially polarized ultraviolet light having a completely polarized component mixed with a non-polarized component.

The alignment layer according to the eighth aspect of the invention is obtained by applying a polymer having at least one of the structures shown in formulae C51 to C53 onto a substrate and irradiating this polymer with partially polarized ultraviolet light having a completely polarized component mixed with a non-polarized component.

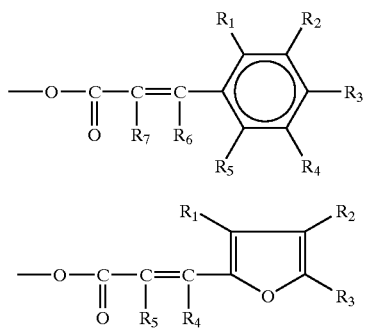

C51

C52

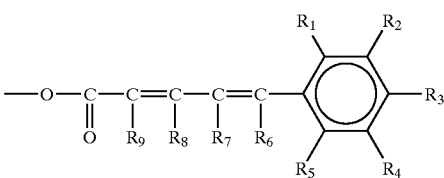

C53 wherein, in formulae C51 to C53, $-R_1$ to $R_9$=—H, halogen group, —CN, or alkyloxy group such as methoxy group.

In a preferred embodiment of the eighth aspect of the invention, the alignment layer is obtained by applying onto a substrate a homopolymer or copolymer shown in formula C54 with side chains having at least one of the structures $W_5$ and $W_6$ shown in formulae C51 to C53 above and with the main chain being at least one of hydrocarbon, acrylate, methacrylate and siloxane, and irradiating this applied polymer with partially polarized ultraviolet light having a completely polarized component mixed with a non-polarized component.

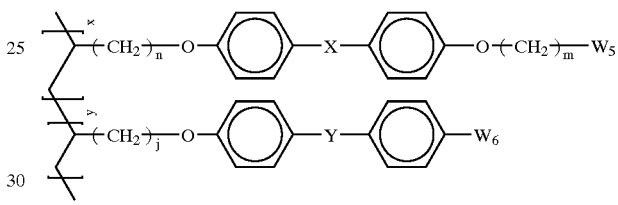

C54 wherein, in formula C54, x:y=100 to 0:0 to 100 whereupon x+y=100; n=1 to 12, m=1 to 12, j=1 to 12; X and Y=none, —COO—, —OCO—, —N=N—, —C=C— or —$C_6H_4$—; and $W_5$ and $W_6$ are the same as in formulae C51 to C53.

According to the seventh and eighth aspects of the invention described above, the polymer is irradiated with ultraviolet light having a completely polarized component mixed with a non-polarized component, thereby causing the photo-crosslinking reaction of the polymer to readily give an alignment layer exhibiting a pre-tilt angle upon conversion into liquid crystals. That is, when non-polarized ultraviolet light is partially transmitted and partially reflected by an interface between two mediums e.g. air and a transparent plate such as quartz plate, the transmitted light turns into a partially polarized light having a completely polarized component mixed with a non-polarized component. Then, the polymer is irradiated with this partially polarized light whereby an alignment layer can be formed without using any special polarizer. For example, in case the polymer of formula C54 ($W_5$=a structure shown in formula C51, x:y=100:0, n=6, m=2, X=none, and $-R_1$ to $R_7$=—H) is applied onto a substrate and this polymer is subsequently irradiated with non-polarized ultraviolet light from a high-pressure mercury lamp via a slantly arranged transparent plate such as quartz plate, when the angle of incidence of ultraviolet light to the transparent plate is 50° or greater, the photosensitive group in formula C54 undergoes dimerization reaction to give an alignment layer exhibiting a pre-tilt angle upon conversion into liquid crystals. This dimerization reaction is a photo-crosslinking reaction accompanied by formation of a cyclobutane bond as shown in reaction formula C55 below. In this reaction, it is necessary to irradiate the polymer with a light having a wavelength at which its photosensitive groups can react. This wavelength varies depending on the type of the polymer but is generally 200 to 500 nm among which a wavelength of 250 to 450 nm is particularly effective.

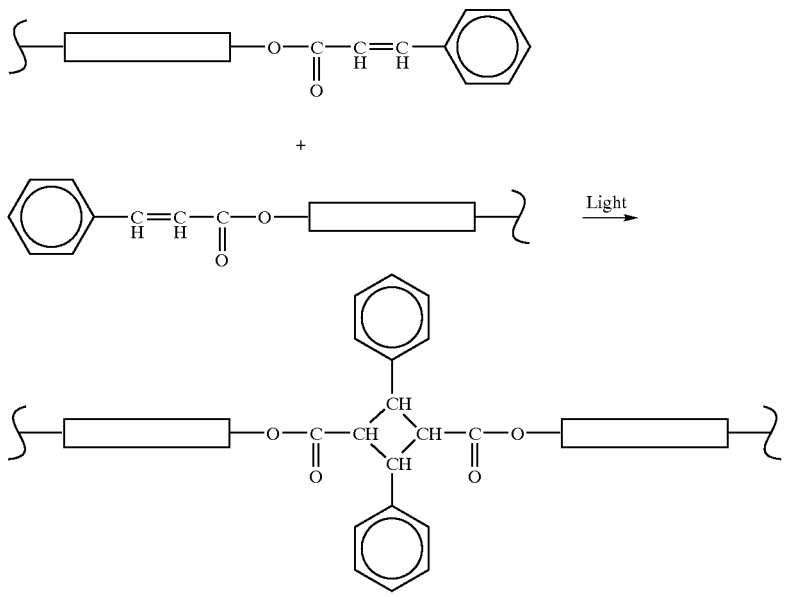

C55

The alignment layer described above can be formed by a simple optical alignment device where a transparent plate such as quartz plate is arranged slantly in a light path of a source of irradiation. Further, because the transparent plate having an arbitrary size can be readily obtained, an alignment layer of large area can easily be formed. This alignment layer can also be effectively utilized in liquid crystal displays.

BRIEF DESCRIPTION OF THE DRAWINGS

The present invention will be understood more clearly from the following description of preferred embodiments by reference to the appended drawings. However, these embodiments and drawings are set forth for illustrative and descriptive purposes only and should not be used to define the scope of the invention. The scope of the invention is defined by the appended claims. In the accompanying drawings, like reference numerals are used to denote like parts throughout the several views.

FIG. 1 is a perspective view showing the process for producing the alignment layer according to the first and second aspects of the invention.

FIG. 2 is a schematic illustration showing reactivity resulting from irradiated light and arrangement of side chains.

DETAILED DESCRIPTION OF THE INVENTION

Figure 3:
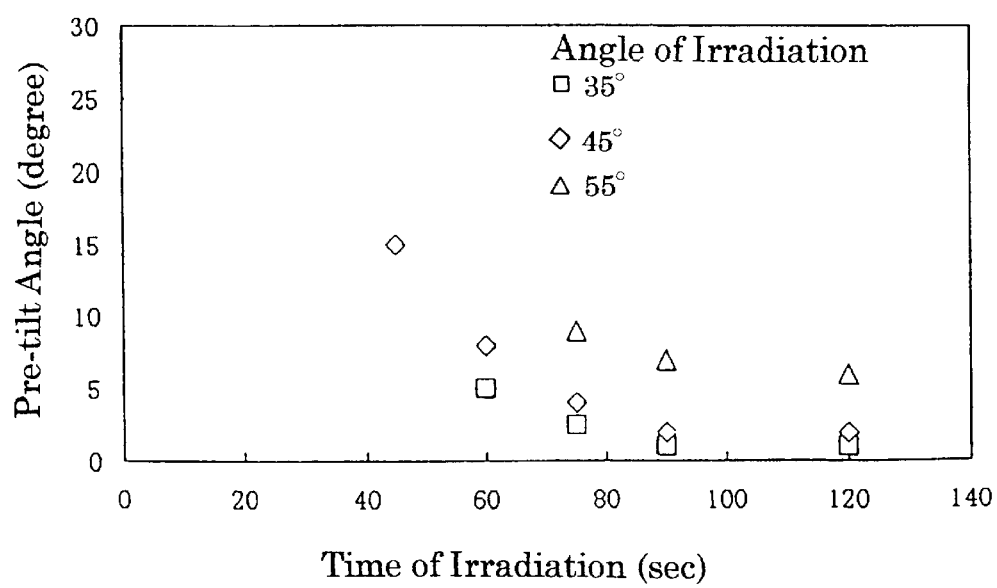
FIG. 3 is a plot diagram showing the relationship between irradiation time and pre-tilt angle when the angle of irradiation is varied from 35 to 55°.

Hereinafter, embodiments of the invention are described by reference to the drawings.

An embodiment of the first and second aspects of the invention is described in FIGS. 1 and 2. First, as shown in FIG. 1, a polymer is applied (spin-coated or cast) onto one principal surface of a substrate 11 to form a coated layer 12. The substrate 11 is, for example, made of glass and may be provided with electrode patterns on the one principal surface by vapor deposition technique prior to the coating of the layer 12. This polymer is the one shown in chemical formula C4. When this coated layer 12 is formed, the polymer is not aligned, and its side chains are not be directed in a specific direction. Then, natural light 20 (non-polarized ultraviolet light) is used as a source of irradiation, and the coated layer 12 is irradiated with this light. Then, side chains perpendicular to the direction along which the natural light 20 advances are photo-sensitized more readily than side chains parallel to said direction, to make an anisotropic alignment layer 13.

That is, the conjugated structure of a mesogen side chain containing benzene ring etc. extends in the direction of the major axis of side chain, and electron movement occurs along this direction. Then, the coated layer 12 is placed on an irradiation place where it is irradiated with the natural light 20 whereby as shown in FIG. 2, the portion 12*a* where the direction of electric-field oscillation of the light agrees with the direction of the major axis of side chain in the polymer in the coated layer 12 is easily photo-sensitized, while the portion 12*b* where the direction of electric-field oscillation of the light is perpendicular to the direction of the major axis of side chain is hardly photo-sensitized. Liquid crystal molecules are brought into contact with the surface of the alignment layer 13 irradiated with light in this manner, whereby the amount of reacted side chains in the polymer varies depending on their direction, and by this influence, the whole of the liquid crystal molecules is aligned.

To promote the dimerization reaction of photosensitive groups in side chains, it is essential to irradiate the polymer with a light having a wavelength suitable for the reaction. This wavelength differs depending on the structures shown in formulae C1 to C3, and when biphenyl is used as a mesogen structure and a cinnamate group or its derivative group is used as a photosensitive group, the wavelength is usually 200 to 500 nm, and particularly a wavelength of 250 to 450 nm is effective.

Further, the direction of alignment of a side chain in said polymer is parallel to the direction of electric-field oscillation of P wavelength component in natural light, and thus the polymer upon conversion into liquid crystals indicates a pre-tilt angle reliably. Further, because the direction of alignment and density of non-reacted side chains can be regulated by the direction and amount of irradiation with natural light, it is possible to arbitrarily set up the degree and direction of the pre-tilt angle.

FIG. 3 shows a change with irradiation time in the pre-tilt angles of the polymer of formula 4 wherein x:y:z=100:0:0, n=6, m=2, X=none, —$R_1$ to —$R_5$=—H and of the polymer of formula 4 wherein x:y:z=0:100:0, j=6, Y=none, —$R_6$ to —$R_{10}$=—H, under irradiation with natural light.

In this irradiation, a high-pressure mercury lamp is used as a source of irradiation, and the angles of irradiation are 35°, 45° and 55°, respectively to the direction of a normal line of the substrate. As is evident from FIG. 3, the pre-tilt angle is gradually decreased with a lapse of the irradiation time. From this experimental result, it can be understood that there is a correlation between the irradiation time and the pre-tilt angle. Further, because the pre-tilt angle is varied by changing the angle of irradiation, it is understood that there is also a correlation between the angle of irradiation and the pre-tilt angle.

As described above, the degree of the pre-tilt angle of liquid crystal molecules can be arbitrarily set by regulating the angle of irradiation and the time (amount) of irradiation, and accordingly, the resulting alignment can be used in various liquid crystal displays in TN, VA and IPS modes.

For measurement of said pre-tilt angles, a crystal rotation method was used. In this measurement method, a sample to be measured is inserted between a pair of polarizers, then rotated and simultaneously irradiated with He-Ne laser rays at a wavelength of 633 nm, and the intensity of transmission is measured. According to this measurement method, the 3-dimensional birefringence of the sample can be measured.

Now, the method of synthesizing the polymers used in the first and second aspects of the invention is described.

Monomer 1

4,4'-Biphenyldiol was reacted with 1,6-dibromohexane under alkaline conditions to synthesize 4-(6-bromohexyloxy)-4'-biphenyl. Then, this product was reacted with lithium methacrylate to synthesize 4-hydroxy-4'-(6'-biphenyloxyhexyl)methacrylate. Thereafter, cinnamoyl chloride was added thereto under basic conditions to synthesize the methacrylic ester shown in formula C5.

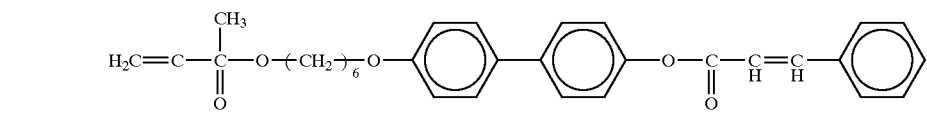

C5

Monomer 2

4,4'-Biphenyldiol and 2-chloroethanol were heated under alkaline conditions to synthesize 4-hydroxy-4'-hydroxyethoxybiphenyl. Then, this product was reacted under alkaline conditions with 1,6-dibromohexane to synthesize 4-(6-bromohexyloxy)-4'-hydroxyethoxybiphenyl. Thereafter, it was reacted with lithium methacrylate to synthesize 4-hydroxyethoxy-4'-(6'-biphenyloxyhexyl) methacrylate. Thereafter, cinnamoyl chloride was added thereto under basic conditions to synthesize the methacrylic ester ate shown in formula C6.

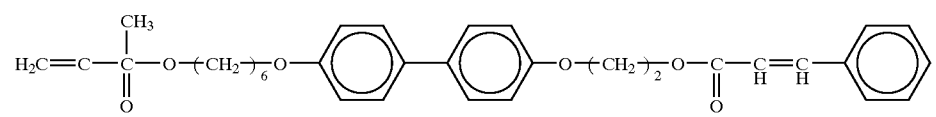

C6

Monomer 3

4,4'-Biphenyldiol was reacted with 1,6-dibromohexane under alkaline conditions to synthesize 4-(6-bromohexyloxy)-4'-hydroxybiphenyl. Then, this product was reacted with lithium methacrylate to synthesize 4-hydroxy-4'-(6'-biphenyloxyhexyl)methacrylate. Thereafter, cinnamoyl 2-methoxychloride was added thereto under basic conditions to synthesize the methacrylate shown in formula C7.

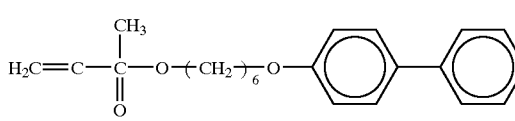
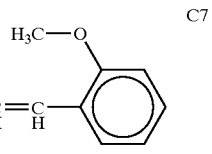

Monomer 4

4,4'-Biphenyldiol and 2-chlorohexanol were heated under alkaline conditions to synthesize 4-hydroxy-4'-hydroxyhexyloxybiphenyl. Then, this product was reacted under alkaline conditions with 1,6-dibromohexane to synthesize 4-(6-bromohexyloxy)-4'-hydroxyhexyloxybiphenyl. Thereafter, it was reacted with lithium methacrylate to synthesize 4-hydroxyhexyloxy-4'-(6'-biphenyloxyhexyl) methacrylate. Thereafter, cinnamoyl 2-methoxychloride was added thereto under basic conditions to synthesize the methacrylic ester shown in formula C8.

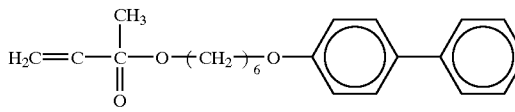
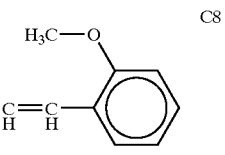

Monomer 5

4-Hydroxy-4'-cyanobiphenyl was reacted with 1,6-dibromohexane under alkaline conditions to synthesize 4-(6-bromohexyloxy)-4'-cyanobiphenyl. Then, this product was reacted with lithium methacrylate to synthesize 4-cyano-4'-(6'-biphenyloxyhexyl) methacrylate. Thereafter, cinnamoyl 2-methoxychloride was added thereto under basic conditions to synthesize the methacrylic ester shown in formula C9.

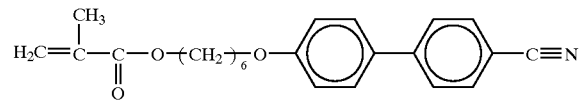

Polymer 1

The above monomer 1 was dissolved in tetrahydrofuran, and AIBN (azobisisobutyronitrile) was added as a reaction initiator for polymerization whereby polymer 1 was obtained. The polymer 1 indicated liquid crystallinity at a temperature in the range of 144 to 219° C.

Polymer 2

The above monomer 2 was dissolved in tetrahydrofuran, and AIBN (azobisisobutyronitrile) was added as a reaction initiator for polymerization whereby polymer 2 was obtained. The polymer 2 indicated liquid crystallinity at a temperature in the range of 47 to 75° C.

Polymer 3

The above monomer 4 was dissolved in tetrahydrofuran, and AIBN (azobisisobutyronitrile) was added as a reaction initiator for polymerization whereby polymer 3 was obtained. The polymer 3 indicated liquid crystallinity at a temperature in the range of 92 to 116° C.

Polymer 4

The above monomers 3 and 5 were dissolved at a ratio of 1:1 by volume in tetrahydrofuran, and AIBN (azobisisobutyronitrile) was added as a reaction initiator for polymerization whereby polymer 4 was obtained. The polymer 4 indicated liquid crystallinity at a temperature in the range of 44 to 99° C.

EXAMPLE 1

The above polymer 1 was dissolved in chloroform and spin-coated at a thickness of about 100 nm onto one principal surface of a substrate coated with ITO (indium tin oxide) forming electrodes. This substrate was arranged at an inclined angle of 55° to a horizontal plane and irradiated with natural light at room temperature for 120 seconds in a perpendicular direction to a horizontal plane. Two sheets of such substrates were prepared and liquid crystal ZLI 2061 was charged therebetween whereby a TN-type liquid crystal cell of 4.5 μm in thickness was assembled. The driving voltage of this TN-type liquid crystal cell was 2 V. An anti-parallel type cell having said substrates was preferred, and the pre-tilt angle of this cell was 6° as determined by the crystal rotation method.

EXAMPLE 2

The above polymer 2 was dissolved in chloroform and spin-coated at a thickness of about 100 nm onto a substrate coated with ITO. This substrate was arranged at an inclined angle of 60° to a horizontal plane and irradiated with natural light at room temperature for 200 seconds in a perpendicular direction to a horizontal plane. Two sheets of such substrates were used to prepare an anti-parallel type cell, and liquid crystal ZLI 2061 was charged into the inside thereof. The pre-tilt angle of this cell was 45° as determined by the crystal rotation method.

EXAMPLE 3

The above polymer 2 was dissolved in chloroform and spin-coated at a thickness of about 100 nm onto a substrate coated with ITO. This substrate was arranged at an inclined angle of 60° to a horizontal plane and irradiated with natural light at room temperature for 180 seconds in a perpendicular direction to a horizontal plane. Two sheets of such substrates were used to prepare an anti-parallel type cell, and liquid crystal ZLI 2061 was charged into the inside thereof. The pre-tilt angle of this cell was 55° as determined by the crystal rotation method.

EXAMPLE 4

The above polymer 3 was dissolved in chloroform and spin-coated at a thickness of about 100 nm onto a substrate coated with ITO. This substrate was arranged at an inclined angle of 60° to a horizontal plane and irradiated with natural light at room temperature for 90 seconds in a perpendicular direction to a horizontal plane. Two sheets of such substrates were used to prepare an anti-parallel type cell, and liquid crystal ZLI 2061 was charged into the inside thereof. The pre-tilt angle of this cell was 82° as determined by the crystal rotation method.

EXAMPLE 5

The above polymer 4 was dissolved in chloroform and spin-coated at a thickness of about 100 nm onto a substrate coated with ITO. This substrate was arranged at an inclined angle of 30° to a horizontal plane and irradiated with natural light at room temperature for 500 seconds in a perpendicular direction to a horizontal plane. Two sheets of such substrates were used to prepare an anti-parallel type cell, and liquid crystal ZLI 2061 was charged into the inside thereof. The pre-tilt angle of this cell was 82° as determined by the crystal rotation method.

EXAMPLE 6

The above polymer 4 was dissolved in chloroform and spin-coated at a thickness of about 100 nm onto a substrate coated with ITO. This substrate was arranged at an inclined angle of 30° to a horizontal plane and irradiated with natural light at room temperature for 700 seconds in a perpendicular direction to a horizontal plane. Two sheets of such substrates were used to prepare an anti-parallel type cell, and liquid crystal ZLI 2061 was charged into the inside thereof The pre-tilt angle of this cell was 59° as determined by the crystal rotation method.

Hereinafter, one embodiment of the third aspect of the invention is described by reference to the drawings.

Figure 4:
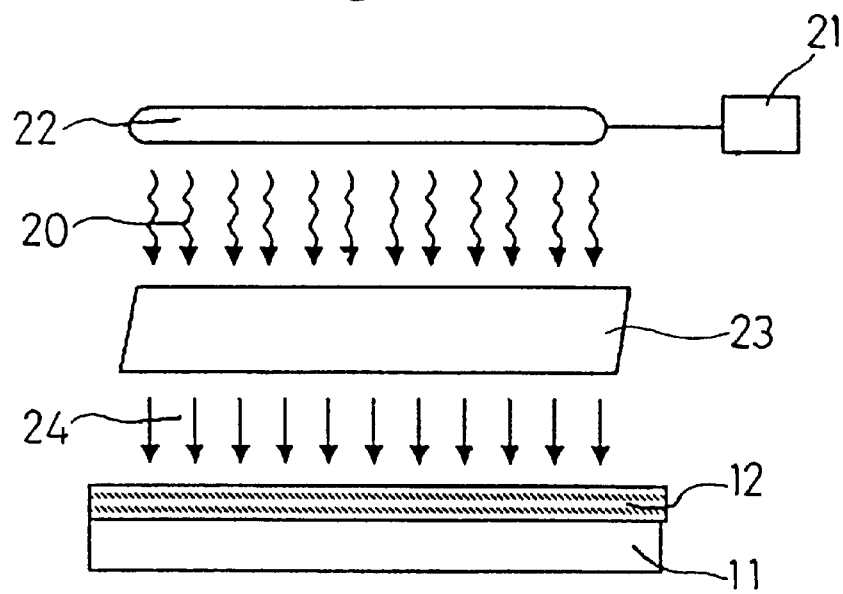
FIG. 4 is a side view showing the process for producing the alignment layer according to one embodiment of the third to sixth aspects of the invention.
Figure 5:
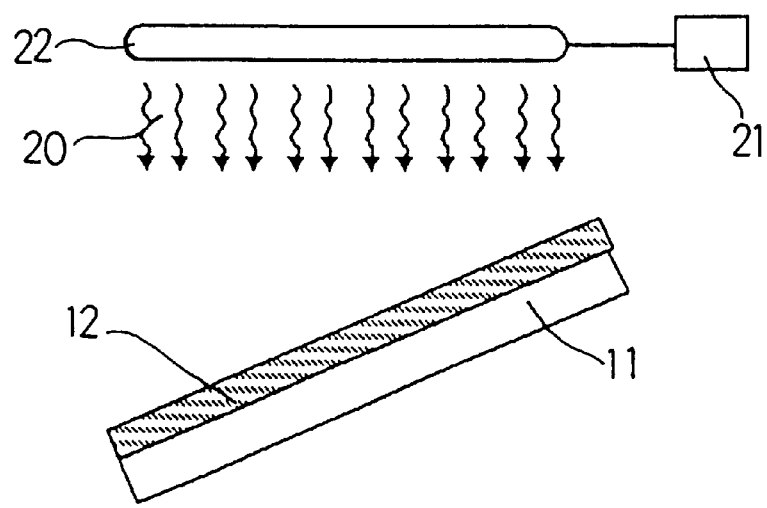
FIG. 5 is a side view explaining another embodiment of these aspects of the invention.

First, as shown in FIG. 4, a polymer is applied (spin-coated or cast) onto a substrate 11 to form a coated layer 12. This polymer is the one shown in formulae C11 to C14 or C17. When this coated layer 12 is formed, the polymer is not aligned, and its side chains are not directed in a specific direction. Then, non-polarized light 20 emitted from UV lamp 22 excited by power source 21 is converted into linear polarized light 24 through a polarizing element 23 such as, for example, a Glan-Taylor prism, and the coated layer 12 applied onto the substrate 11 is irradiated with this linear polarized light 24. Alternatively, as shown in FIG. 5, the coated layer 12 is directly irradiated with non-polarized light 20 emitted from UV lamp 22 without using the polarizing element 23. The layer may be irradiated with partially polarized light in place of the non-polarized light. In the embodiment of FIG. 5, the substrate 11 is inclined at a predetermined angle to the direction of irradiation of non-polarized light 20.

As described above, depending on whether the direction of advancing irradiation light or its cross direction, or whether the direction along which the electric-field oscillation of irradiation light is larger or its cross direction, there occur differences in the degree of dimerization (degree of photo-crosslinking) of photosensitive groups in the polymer upon irradiation, resulting in formation of an anisotropic layer. Then, when liquid crystal molecules are brought into contact with such an anisotropic layer, the liquid crystal molecules are aligned due to their interaction with the layer. To advance this dimerization reaction, it is necessary to irradiate the polymer with a light having a wavelength at which the portion of photosensitive groups in the polymer shown in formulae C11 to C14 or C17 can react. This wavelength differs depending on the type of the polymer, but it is generally 200 to 500 nm, and a wavelength of 250 to 450 nm is particularly effective.

The polymer described above can also be endowed with functions for alignment of liquid crystals by low irradiation energy. That is, functions excellent in alignment can be conferred on the polymer by using a small source of irradiation. This is because the polymer has improved sensitivity with light absorption extended to a longer wavelength region, as compared with a polymer with a similar structure having a cinnamate group.

Figure 6:
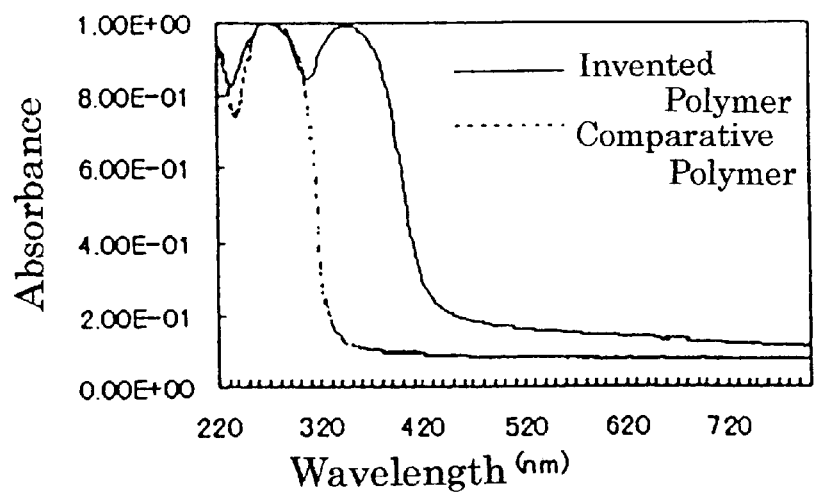
FIG. 6 is a view showing spectrometric absorption spectra of the polymer according to the third and fourth aspects of the invention and of a comparative polymer.

FIG. 6 shows spectrometric absorption spectra of the polymer of the invention in formula C17 wherein $W_1$=formula C13, x:y=100:0, n=6, m=2, X=none, —$R_1$ to —$R_8$=—H, and —$R_9$=—CN, and of a comparative polymer having the same structure as above except that α-cyano-cinnamylidene acetyl group has been replaced by a cinnamate group. As is evident from FIG. 6, while the light absorption edge exhibited by the comparative polymer is in the vicinity of 330 nm, the of light absorption edge exhibited by the polymer of the invention extends to the vicinity of 420 nm.

Figure 7:
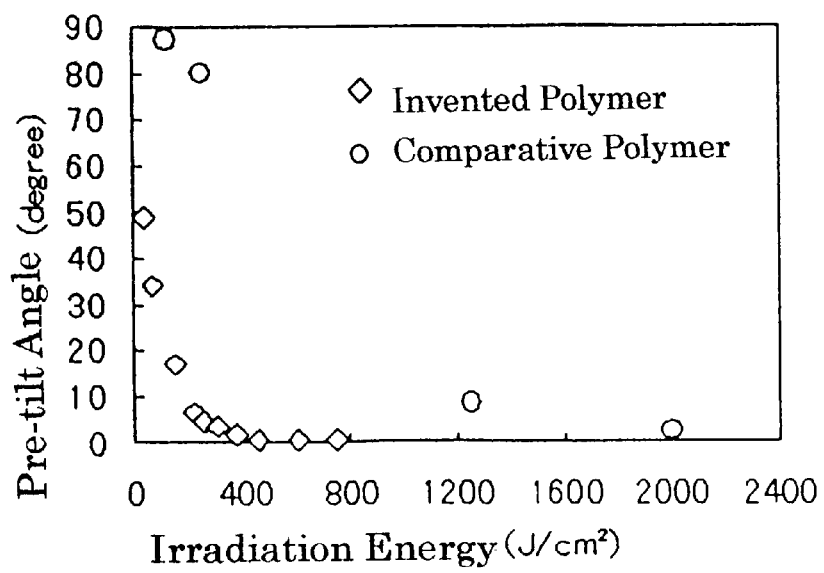
FIG. 7 is a view showing a change in the pre-tilt angles of the polymer according to the third and fourth aspects of the invention and of the comparative polymer under varying irradiation energy.

FIG. 7 shows the result of examination of irradiation energy necessary for conferring the functions for alignment of liquid crystals on the above two polymers by a high-pressure mercury lamp. When these polymers are used, the pre-tilt angle of liquid crystal molecules is decreased from 90° to nearly 0° as irradiation energy increases. When the comparative polymer is used, 1500 mJ/cm$^2$ or more is required for attaining a pre-tilt angle of 5° or less, while in the case of the polymer of the invention, about 250 mJ/cm$^2$ suffices for attaining this pre-tilt angle.

Now, the process for synthesizing the polymer used in the third aspect of the invention is described.

(Polymer 11)

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate whereby 4-hydroxyethoxy-4'-(6'-biphenyloxyhexyl)methacrylate was synthesized. This product was dissolved in tetrahydrofuran, and AIBN (azobisisobutyronitrile) was added thereto as a reaction initiator for polymerization whereby a polymer having a hydroxyl group at the terminal of its side chain was obtained.

Then, the polymer having a hydroxyl group at the terminal of its side chain was reacted in tetrahydrofuran with cinnamylidene acetate chloride synthesized by cinnamylidene acetic acid with thionyl chloride, whereby polymer 11 shown in formula C19 was obtained.

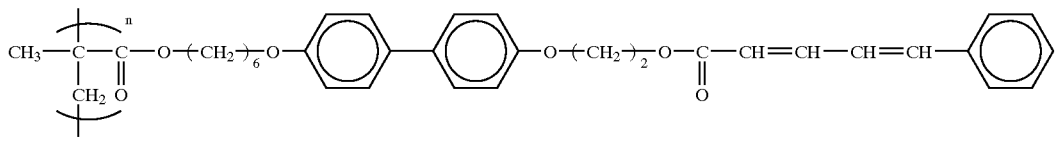

C19

(Polymer 12)

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate, whereby 4-hydroxyethoxy-4'-(6'-biphenyloxyhexyl)methacrylate was synthesized.

This product was dissolved in tetrahydrofuran, and AIBN (azobisisobutyronitrile) was added thereto as a reaction initiator for polymerization whereby a polymer having a hydroxyl group at the terminal of its side chain was obtained.

Then, the polymer having a hydroxyl group at the terminal of its side chain was reacted in tetrahydrofuran with α-cyanocinnamylidene acetate chloride synthesized by α-cyanocinnamylidene acetic acid with thionyl chloride, whereby polymer 2 shown in formula C20 was obtained.

EXAMPLE 11

Polymer 11 was dissolved in chloroform and spin-coated at a thickness of about 100 nm onto a substrate coated with ITO (indium tin oxide). This substrate was arranged at an inclined angle of 30° to a horizontal plane and irradiated with 2.5 mW/cm$^2$ linear polarized light (converted by a Glan-Taylor prism) at room temperature for 180 seconds in a perpendicular direction to a horizontal plane. Two sheets of such substrates were prepared and liquid crystal E7 (Merck Japan) was charged therebetween whereby a TN-type liquid crystal cell of 4.5 μm in thickness was assembled. When this liquid crystal cell was observed with crossed Nicols, the alignment of liquid crystal molecules was confirmed and their pre-tilt angle was 7.5°. The driving voltage of this TN-type liquid crystal cell was 2 V.

EXAMPLE 12

Polymer 12 was dissolved in chloroform and spin-coated at a thickness of about 100 nm onto a substrate coated with

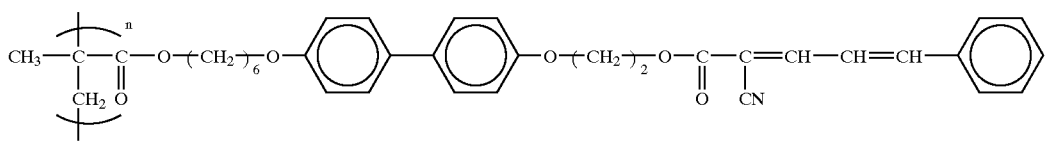

C20

(Comparative Polymer 13)

This polymer 13 has the same structure as above except that the cinnamylidene acetyl group has been replaced by a cinnamate group.

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. Thereafter, cinnamoyl chloride was added thereto under basic conditions to give a monomer. This monomer was dissolved in tetrahydrofuran, and AIBN (azobisisobutyronitrile) was added thereto as a reaction initiator for polymerization, whereby comparative polymer 13 shown in formula C21 was obtained.

ITO (indium tin oxide). This substrate was arranged at an inclined angle of 30° to a horizontal plane and irradiated with 2.5 mW/cm$^2$ linear polarized light (converted by a Glan-Taylor prism) at room temperature for 100 seconds in a perpendicular direction to a horizontal plane. Two sheets of such substrates were prepared and liquid crystal E7 (Merck Japan) was charged therebetween whereby a TN-type liquid crystal cell of 4.5 μm in thickness was constructed. When this liquid crystal cell was observed with crossed Nicols, the alignment of liquid crystal molecules was confirmed and their pre-tilt angle was 5.0°. The driving voltage of this TN-type liquid crystal cell was 2 V.

Comparative Example 11

Comparative polymer 13 was dissolved in chloroform and spin-coated at a thickness of about 100 nm onto a substrate coated with ITO (indium tin oxide). This substrate was

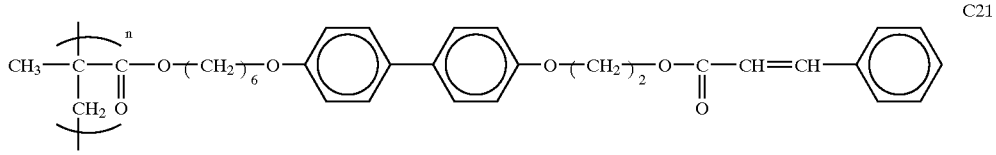

C21 arranged at an inclined angle of 30° to a horizontal plane and irradiated with 2.5 mW/cm² linear polarized light (converted by a Glan-Taylor prism) at room temperature for 100 seconds in a perpendicular direction to a horizontal plane. Two sheets of such substrates were prepared and liquid crystal E7 (Merck Japan) was charged therebetween whereby a TN-type liquid crystal cell of 4.5 μm in thickness was constructed. However, in this liquid crystal cell, liquid crystal molecules indicated nearly homeotrophic alignment (pre-tilt angle: 80°) and a TN-type liquid crystal cell could not be assembled. On the other hand, when the substrate was arranged at an inclined angle of 30 ° to a horizontal plane and irradiated with 2.5 mW/cm² linear polarized light (converted by a Glan-Taylor prism) at room temperature for 500 seconds in a perpendicular direction to a horizontal plane, the pre-tilt angle was 8.0°, and a TN-type liquid crystal cell could be prepared. In this case, however, irradiation for a longer time is necessary, and indication of the pre-tilt angle is poor.

Hereinafter, the fourth aspect of the invention is described.

In this aspect of the invention similar to the first to third aspects of the invention, a polymer is applied onto the substrate to form a coated layer. This polymer is shown in formulae C31 to C34 or C37. Then, similar to the third aspect of the invention, non-polarized light 20 emitted from UV lamp 22 is converted into linear polarized light 24 via a polarizing element 23, and the coated layer 12 is irradiated with this polarized light 24. Alternatively, without polarizing element 23, the coated layer 12 is directly irradiated with non-polarized light 20 emitted from UV lamp 22. The polymer may be irradiated with partially polarized light in place of the non-polarized light 20.

An anisotropic alignment layer can be obtained as well in the manner described above. Then, when liquid crystal molecules are brought into contact with this alignment layer, the liquid crystal molecules are aligned due to their interaction with the layer. To advance this dimerization reaction, the polymer should be irradiated with a light having a wavelength at which the portion of photosensitive groups in the polymer shown in formulae C31 to C34 or C37 can react. This wavelength differs depending on the type of the polymer, but it is generally 200 to 500 nm, and a wavelength of 250 to 450 nm is particularly effective.

The polymer described above can also be endowed with functions for alignment of liquid crystals by low irradiation energy. That is, functions excellent in alignment can be conferred on the polymer by using a small source of irradiation.

Figure 8:
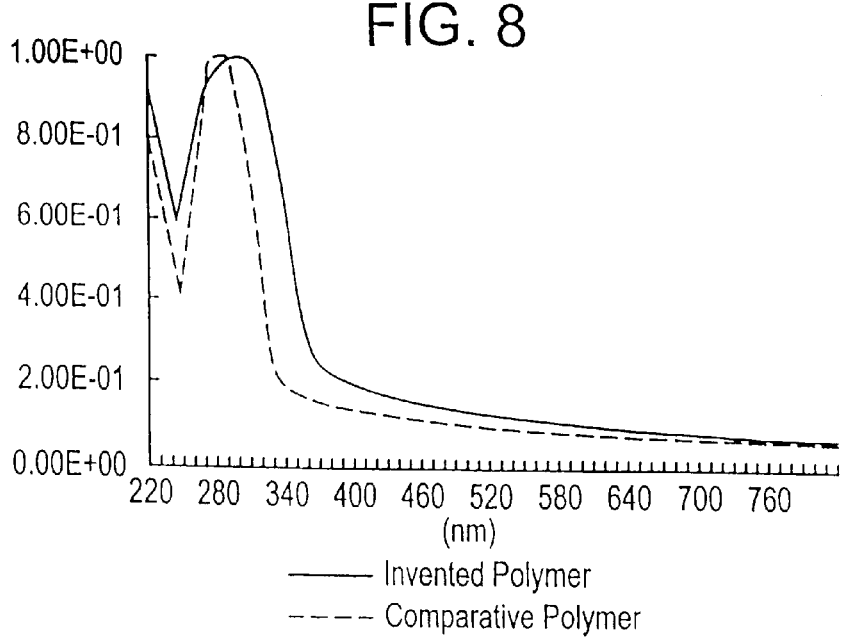
FIG. 8 is a view showing spectrometric absorption spectra of the polymer according to the fifth and sixth aspects of the invention and of a comparative polymer.

FIG. 8 shows spectrometric absorption spectra of the polymer of the invention in formula C37 wherein $W_3$ is formula C33, x:y=100:0, n=6, m=2, X=none, and —$R_1$ to —$R_5$ =—H and of a comparative polymer having the same structure as above except that the β-(2-furyl)acryloyl group has been replaced by a cinnamate group. As is evident from FIG. 8, while the light absorption edge exhibited by the comparative polymer is in the vicinity of 330 nm, the light absorption edge exhibited by the polymer of the invention extends to the vicinity of 370 nm.

Figure 9:
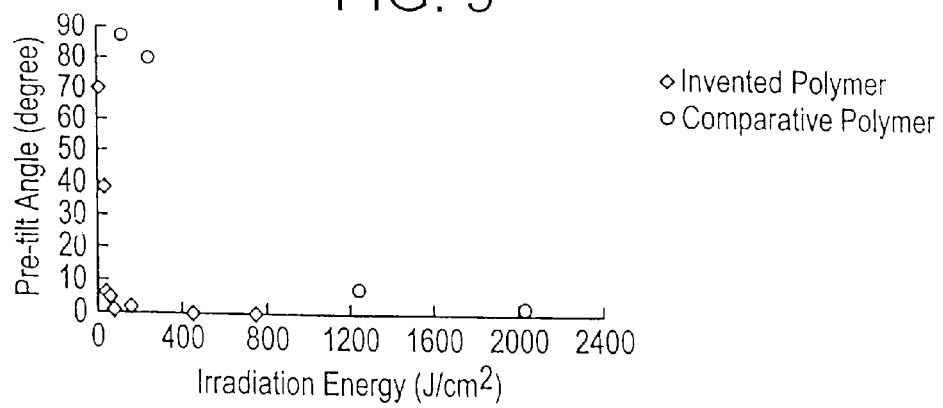
FIG. 9 is a view showing a change in the pre-tilt angles of the polymer according to the fifth and sixth aspects of the invention and of the comparative polymer under varying irradiation energy.

FIG. 9 shows the result of examination of irradiation energy necessary for conferring the functions for alignment of liquid crystals on the above two polymers by a high-pressure mercury lamp. As is evident from FIG. 9, when the comparative polymer is used, 1200 mJ/cm² or more is required for attaining a pre-tilt angle of 5° or less, while in the case of the polymer of the invention, about 30 mJ/cm² suffices for attaining this pre-tilt angle.

Further, the polymer of this invention is excellent in thermostability.

Figure 10:
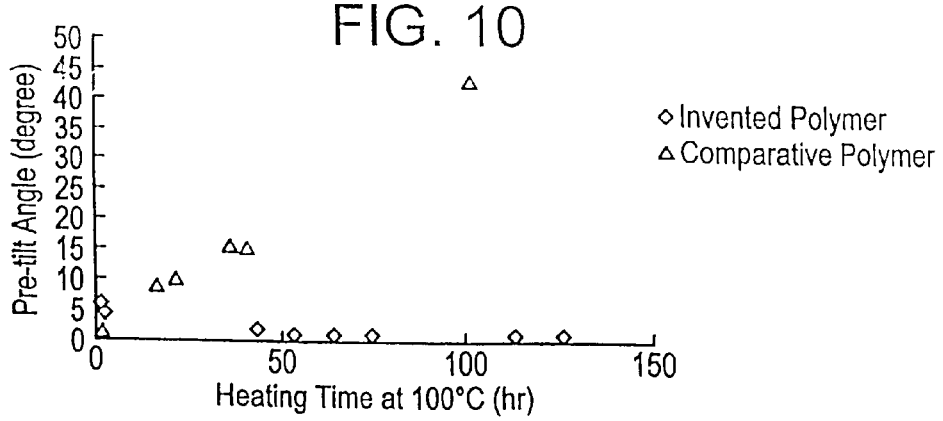
FIG. 10 is a view showing evaluation of thermostability (change with time in pre-tilt angles when exposed to an atmosphere at 100° C.) when the polymer according to the fifth and sixth aspects of the invention and a comparative polymer are formed into liquid crystal cells.

FIG. 10 shows a change with time in the pre-tilt angles of a liquid crystal cell made of the polymer of the invention in formula C37 wherein $W_3$ is formula C33, x:y=100:0, n=6, m=2, X=none and —$R_1$ to —$R_5$=—H and of liquid crystal cell made of a comparative polymer having the same structure as above except that the β-(2-furyl)acryloyl group has been replaced by a cinnamate group, when left in an atmosphere at 100° C. for 100 hours. As is evident from FIG. 10, the liquid crystal cell obtained using the polymer of the present invention, even after left for 100 hours in an atmosphere at 100° C., does not significantly change the pre-tilt angle of 2° exhibited before heating. On the other hand, the liquid crystal cell obtained using the comparative polymer greatly changes the pre-tilt angle from 2° before heating to 43° after heating. This is possibly because the β-(2-furyl) acryloyl group in the polymer according to the fourth aspect of the invention has both photosetting and thermosetting functions and thus the anisotropy of the polymer is fixed by setting upon irradiation with polarized or non-polarized ultraviolet light. On the other hand, in the comparative polymer the cinnamate group maintains its anisotropy and is not thermoset, thus causing the change of the pre-tilt angle by heating.

The method of synthesizing the polymer used in the fourth aspect of the invention is now described.

(Polymer 21)

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. This product was dissolved in tetrahydrofuran, and AIBN (azobisisobutyronitrile) was added thereto as a reaction initiator for polymerization, whereby a polymer having a hydroxyl group at the terminal of its side chain was obtained.

Then, the polymer having a hydroxyl group at the terminal of its side chain was reacted in tetrahydrofuran with β-(2-furyl)acrylate chloride synthesized by reacting β-(2-furyl)acrylic acid with thionyl chloride, whereby polymer 21 shown in formula C39 was obtained.

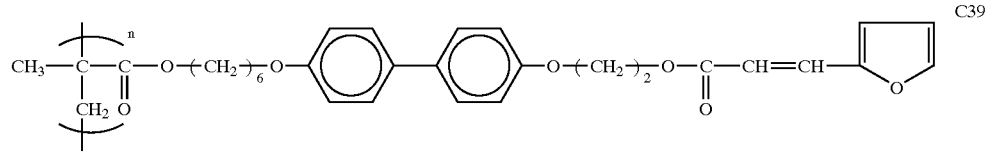

C39

(Comparative Polymer 23)

This polymer 22 has the same structure described above except that the β-(2-furyl)acrylate group has been replaced by a cinnamate group.

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. Finally, cinnamoyl chloride was added thereto under basic conditions to synthesize a monomer. This monomer was dissolved in tetrahydrofuran, and AIBN (azobisisobutyronitrile) was added thereto as a reaction initiator for polymerization, whereby comparative polymer 22 shown in formula C40 was obtained.

Comparative Example 22

Comparative polymer 22 was dissolved in chloroform and spin-coated at a thickness of about 100 nm onto a substrate coated with ITO (indium tin oxide). This substrate was arranged at an inclined angle of 30° to a horizontal plane and irradiated with 2.5 mW/cm$^2$ linear polarized light (converted by a Glan-Taylor prism) at room temperature for 500 seconds in a perpendicular direction to a horizontal plane. Two sheets of such substrates were prepared and liquid crystal E7 (Merck Japan) was charged therebetween whereby a TN-type liquid crystal cell of 4.5 μm in thickness was assembled. In this liquid crystal cell, the alignment of liquid crystal molecules was confirmed and their pre-tilt angle was 8.9°. In this case, however, irradiation for a long period of time is required, and indication of the pre-tilt angle is poor.

The fifth and sixth aspects of the invention are now described.

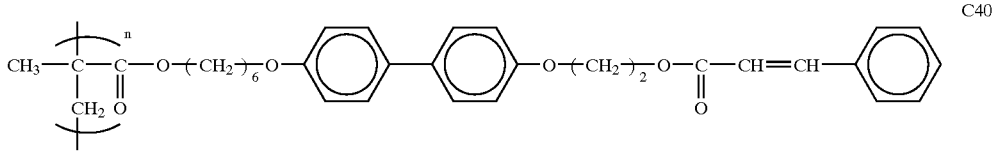

C40

EXAMPLE 21

Polymer 21 was dissolved in chloroform and spin-coated at a thickness of about 100 nm onto a substrate coated with ITO (indium tin oxide). This substrate was arranged at an inclined angle of 30° to a horizontal plane and irradiated with 2.5 mW/cm$^2$ linear polarized light (converted by a Glan-Taylor prism) at room temperature for 20 seconds in a perpendicular direction to a horizontal plane. Two sheets of such substrates were prepared and liquid crystal E7 (Merck In these aspects of the invention too, the polymers of formulae C41 to C46 are irradiated with linear polarized or partially polarized ultraviolet light, thereby forming anisotropic alignment layers. For example, the polymer of the invention shown in formula C48, when high-pressure mercury lamp is used, upon irradiation with low energy of 15 mJ/cm$^2$ (313 nm), gives an alignment layer exhibiting a pre-tilt angle.

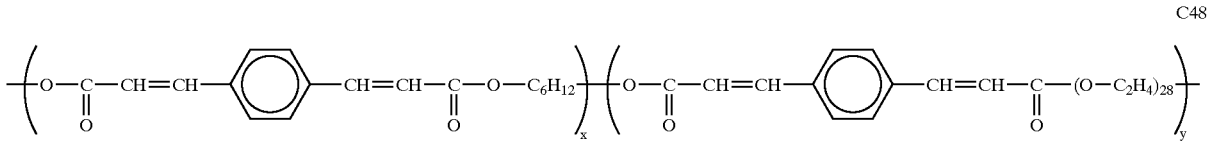

C48

Japan) was charged therebetween whereby a TN-type liquid crystal cell of 4.5 μm in thickness was assembled. When this liquid crystal cell was observed with crossed Nicols, the alignment of liquid crystal molecules was confirmed and their pre-tilt angle was 4.5°. The driving voltage of this TN-type liquid crystal cell was 2 V.

Comparative Example 21

Comparative polymer 22 was dissolved in chloroform and spin-coated at a thickness of about 100 nm onto a substrate coated with ITO (indium tin oxide). This substrate was arranged at an inclined angle of 30° to a horizontal plane and irradiated with 2.5 mW/cm$^2$ linear polarized light (converted by a Glan-Taylor prism) at room temperature for 20 seconds in a perpendicular direction to a horizontal plane. Two sheets of such substrates were prepared and liquid crystal E7 Merck Japan) was charged therebetween whereby a TN-type liquid crystal cell of 4.5 μm in thickness was assembled. In this liquid crystal cell, the liquid crystal alignment layer was swollen and destroyed, and the alignment of liquid crystal molecules was not observed.

wherein, x:y=62:38.

The polymer according to the fifth and sixth aspects of the present invention can obtain alignment by crosslinking an aromatic acid component having an unsaturated bond in a specific direction. That is, when the aromatic acid component having an unsaturated bond is irradiated with linear polarized ultraviolet light, the photo-crosslinking reaction of the aromatic acid component directed in a parallel direction to the direction of electric-field oscillation of this ultraviolet light is more promoted than that of the aromatic acid component directed in a perpendicular direction thereto, thereby giving an anisotropic alignment layer whose photo-crosslinking reaction has advanced in the specific direction. Because a molecular chain of the polymer is fixed by this photo-crosslinking reaction, the resulting alignment layer is excellent in thermostability without deteriorating anisotropy even after heating. Further, the thermostability and strength of the alignment layer depend on the strength of a cross-linkage of the aromatic acid component having an unsaturated bond. On the other hand, layer-forming properties depend on the content of a component improving layer-forming properties in the polymer materials. From this viewpoint, the content of the aromatic acid component having an unsaturated bond is preferably not less than 10% by weight.

Since the alignment layer excellent in thermostability, which shows a pre-tilt angle by low irradiation energy, is obtained according to the fifth and sixth aspects of the present invention, it is useful as an alignment layer in liquid crystal displays driven particularly in an IPS (isoprene switching) mode.

Now, the method of synthesizing the polymer used in the fifth and sixth aspects of the invention is described.

First, 1 mol of n-butyl-p-phenylene bis-acrylate, 2 to 6 mols of hexamethylene glycol, 0.5 to 1.5 mols of polytetramethylene glycol (molecular weight: 1200), 0.95 mol of tetrabutyl titanate, and 0.74 mol of tridecyl phosphite are placed in a reaction vessel. Then, the mixture is reacted at 150° C. (1 hour), at 180° C. (0.5 hour) and then at 220° C. under reduced pressure. Then, n-butanol formed by ester exchange and excess hexamethylene glycol are distilled away. Polymers 31, 32 and 33 which respectively contained 30 wt-%, 25 wt-% and 20 wt-% aromatic acid component containing unsaturated bonds were thereby obtained.

EXAMPLE 31

The above polymer 31 was dissolved in dichloroethane and spin-coated at a thickness of about 100 nm onto a substrate coated with ITO (indium tin oxide). The polymer on this substrate was irradiated with 1.5 mW/cm$^2$ (313 nm) linear polarized ultraviolet light at room temperature for 5 to 180 seconds in a perpendicular direction to a horizontal plane to give an alignment layer. Liquid crystal ZLI2061 (Merck Japan) was charged between two sheets of such substrates to construct a TN-type liquid crystal cell of 4.5 µm in thickness. When this TN-type liquid crystal cell was observed under crossed Nicols and parallel Nicols, a clear contrast between light and shade was observed in the liquid crystal cell with an irradiation time of 10 seconds or more and the alignment of liquid crystal molecules was thus confirmed. Further, the constructed cell was heat-treated in a thermostatic chamber at 100° C for 1.5 hours and then cooled to room temperature. When this heat-treated liquid crystal cell was observed under crossed Nicols and parallel Nicols, it was confirmed that the liquid crystal cell with an irradiation time of 10 seconds or more maintains the performance of liquid crystal alignment before heat treatment.

The results are shown in Table 1. In Table 1, the numbers in the upper column indicate irradiation energy (mJ/cm$^2$) and "○" indicates good alignment, "Δ" insufficient alignment, and "X" poor alignment.

TABLE 1

Irradiation energy and alignment performance in polymer 31

| | Irradiation energy (mJ/cm$^2$)×313 nm | | | | | |
|---|---|---|---|---|---|---|
| | 7.5 | 15 | 45 | 90 | 120 | 240 |
| Liquid crystal cell before heating | Δ | ○ | ○ | ○ | ○ | ○ |
| Liquid crystal cell after heating (100° C. × 1.5 hr) | X | ○ | ○ | ○ | ○ | ○ |

EXAMPLE 32

The above polymer 32 was dissolved in dichloroethane and spin-coated at a thickness of about 100 nm onto a substrate coated with ITO (indium tin oxide). The polymer on this substrate was irradiated with 1.5 mW/cm$^2$ (313 nm) linear polarized ultraviolet light at room temperature for 10 seconds in a perpendicular direction to a horizontal plane to give an alignment layer. Liquid crystal ZLI2061 was charged between two sheets of such substrates to construct a TN-type liquid crystal cell of 4.5 µm in thickness. When this TN-type liquid crystal cell was observed under crossed Nicols and parallel Nicols, a clear contrast between light and shade was observed and the alignment of liquid crystal molecules was thus confirmed.

EXAMPLE 33

The above polymer 33 was dissolved in dichloroethane and spin-coated at a thickness of about 100 nm onto a substrate coated with ITO (indium tin oxide). The polymer on this substrate was irradiated with 1.5 mW/cm$^2$ (313 nm) linear polarized ultraviolet light at room temperature for 10 seconds in a perpendicular direction to a horizontal plane to give an alignment layer. Liquid crystal ZLI2061 was charged between two sheets of such alignment layers to construct a TN-type liquid crystal cell of 4.5 µm in thickness. When this TN-type liquid crystal cell was observed under crossed Nicols and parallel Nicols, a clear contrast between light and shade was observed and the alignment of liquid crystal molecules was thus confirmed.

Comparative Example 31

Polyvinyl cinnamate was dissolved in 26 Thinner (Nissan Chemical Industries, Ltd.) and spin-coated at a thickness of about 100 nm onto a substrate coated with ITO (indium tin oxide), and this substrate was baked at 90° C. for 30 seconds. Then, the polyvinyl cinnamate was irradiated with 1.5 mW/cm$^2$ (313 nm) linear polarized ultraviolet light at room temperature for 300 seconds in a perpendicular direction to a horizontal plane to give an alignment layer. Liquid crystal ZLI2061 was charged between two sheets of such alignment layers to construct a TN-type liquid crystal cell of 4.5 µm in thickness. When this TN-type liquid crystal cell was observed under crossed Nicols and parallel Nicols, a clear contrast between light and shade was observed. However, after the constructed liquid crystal cell was heat-treated in a thermostatic chamber at 100° C. for 1.5 hours, it was cooled to room temperature and this liquid crystal cell was observed with crossed Nicols and parallel Nicols, it was confirmed that the alignment of liquid crystals was disturbed.

Hereinafter, the seventh and eighth aspects of the invention are described.

In these aspects of the invention, the alignment layer is obtained by irradiating a light-alignment polymer with partially polarized ultraviolet light having a completely polarized component mixed with a non-polarized component.

Figure 11:
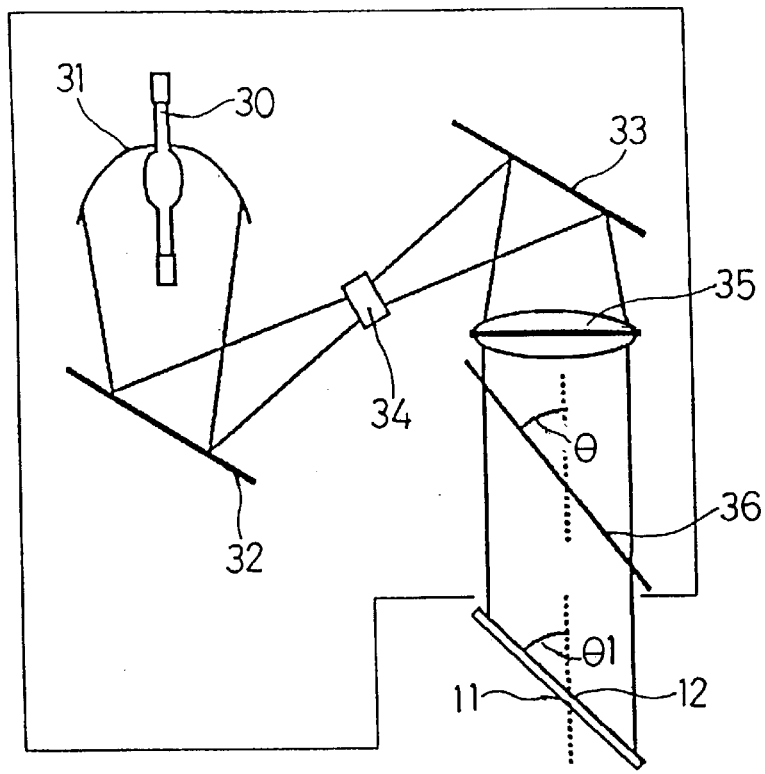
FIG. 11 is a side view showing one example of the irradiation device used in the seventh and eighth aspects of the invention.

FIG. 11 shows an irradiation device used in these aspects of the invention. This device is a conventionally used unit including a high-pressure mercury lamp 30, a light-collection mirror 31, flat mirrors 32 and 33, an integrator lens 34 and a collimator lens 35. One sheet of transparent plate 36 between the substrate 11 provided with coated layer 12 and the collimator lens 35 is arranged in an inclined direction to the light path. As this transparent plate 36, a quartz plate (refractive index=1.4585) is suitably used. If the angle of incidence (θ) of ultraviolet light to the quartz plate 36 is about 50° or more, said coated layer 12 can be endowed with alignment properties.

Figure 12:
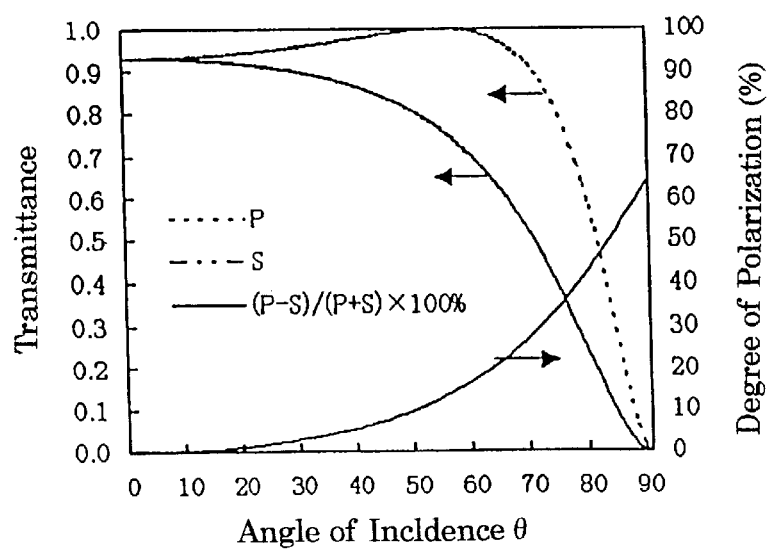
FIG. 12 is a diagram showing the relationship among the angle of incidence of non-polarized ultraviolet light entering a quartz plate (refractive index=1.4585), the transmittance of components P and S, and the degree of polarization of the transmitted light, that is, P−S/(P+S)×100 (%).

When non-polarized light from the above lamp 30 is partially transmitted and partially reflected by an interface between the two mediums of air and quartz plate 36, the transmitted light becomes ultraviolet light having a completely polarized component mixed with a non-polarized component. Now, the case where non-polarized light enters the quartz plate 36 (refractive index=1.4585) is described. Transmittance of component P (component parallel to the light path) and component S (component perpendicular to the light path) in non-polarized light entering the quartz plate 36 and the degree of polarization of the transmitted light {(P−S)/(P+S)}×100 (%) vary depending on the angle of incidence (θ) of the non-polarized light entering the quartz plate 36, and there is the relationship shown in FIG. 12. Here, P and S are intensity of transmitted lights of components P and S respectively, and the intensity of the completely polarized component is expressed as P−S, and P+S is the intensity of whole transmitted lights having the completely polarized component and the non-polarized component.

The polymer according to the seventh and eighth aspects of the invention can be endowed with alignment when the angle of incidence (θ) of non-polarized light is 50° or more, that is, when the degree of polarization of transmitted light {(P−S)/(P+S)}×100 (%) is 10.9 (%) or more. Now, in consideration of the utilization efficiency of component P in non-polarized light, the angle of incidence to the quartz plate 36 is preferably a blue star angle where the transmittance of component P is 1.0.

Figure 13:
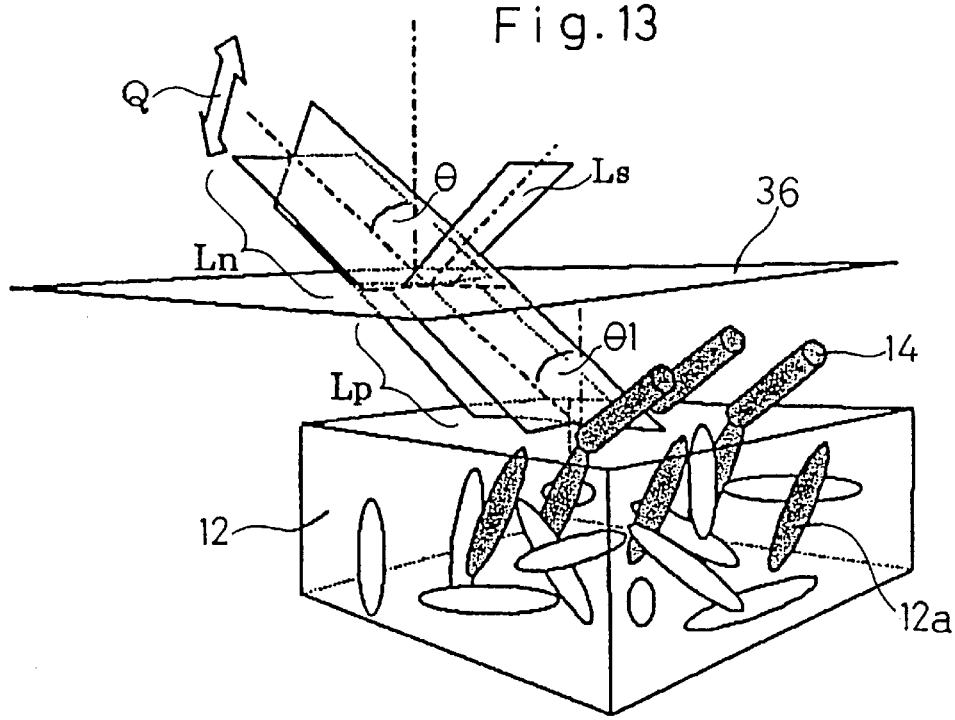
FIG. 13 is a schematic illustration showing the function of the seventh and eighth aspects of the invention.
Figure 14:
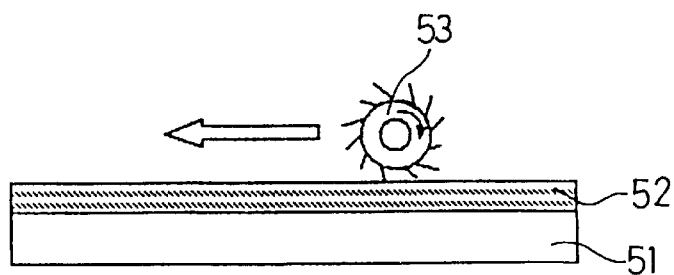
FIG. 14 is a side view showing the process for producing a conventional alignment layer.

Further explanation is made by reference to FIG. 13. FIG. 13 is a schematic illustration where non-polarized light (Ln) enters a quartz plate at a blue star angle, and Ls is a reflected light of component S.

When the polymer shown in formulae C51 to C54 is applied onto a substrate to form coated layer 12, the photosensitive groups in the polymer are not aligned in a specific direction and hence the polymer is isotropic. Now, the quartz plate 36 is arranged slantly at an angle (θ) to the axis of the light path, in the light path of non-polarized ultraviolet light (Ln), and the coated layer 12 is irradiated at an angle of incidence (θ₁) with ultraviolet light (Lp) having a completely polarized component and a non-polarized component having passed through the quartz plate 36, thereby causing the dimerization reaction (photocrosslinking reaction) of the photosensitive groups in the polymer. The density of the side chain 12a in the dimerized coated layer 12 is higher in the direction of electric-field oscillation (Q) of the completely polarized component, resulting in formation of the anisotropic alignment layer 12.

Then, when the liquid crystal molecules 14 are brought into contact with the alignment layer 12, the liquid crystal molecules 14 are aligned parallel to the direction of electric-field oscillation (Q) of the completely polarized component due to their interaction with the alignment layer 12, thus indicating a pre-tilt angle.

Now, the method of synthesizing the polymers used in the seventh and eighth aspects of the invention is described.

Polymer 41

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. Thereafter, cinnamoyl chloride was added thereto under basic conditions to synthesize a methacrylic ester monomer. This monomer was dissolved in tetrahydrofuran, and AIBN (azobisisobutyronitrile) was added thereto as a reaction initiator for polymerization, whereby polymer 41 shown in formula C56 was obtained.

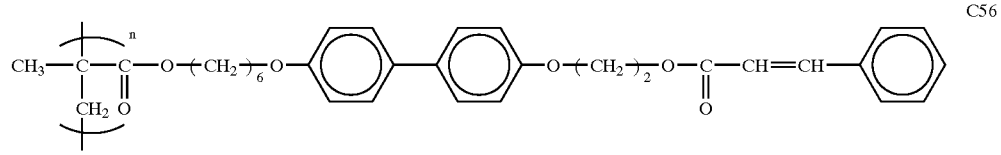

C56

Polymer 42

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. This product was dissolved in tetrahydrofuran, and AIBN (azobisisobutyronitrile) was added thereto as a reaction initiator for polymerization, whereby a polymer having a hydroxyl group at the terminal of its side chain was obtained.

Then, the polymer having a hydroxyl group at the terminal of its side chain was reacted in tetrahydrofuran with β-(2-furyl)acrylate chloride synthesized by reacting β-(2-furyl)acrylic acid with thionyl chloride whereby polymer 42 shown in formula C57 was obtained.

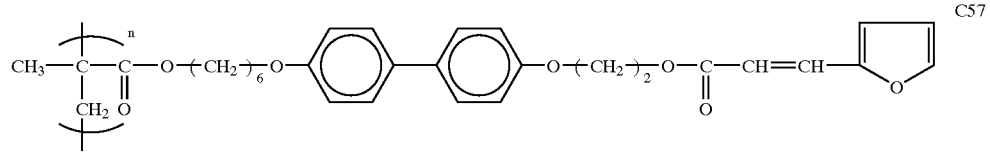

C57

Polymer 43

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. This product was dissolved in tetrahydrofuran, and AIBN (azobisisobutyronitrile) was added thereto as a reaction initiator for polymerization, whereby a polymer having a hydroxyl group at the terminal of its side chain was obtained.

Then, the polymer having a hydroxyl group at the terminal of its side chain was reacted in tetrahydrofuran with cinnamylidene acetate chloride synthesized by reacting cinnamylidene acetic acid with thionyl chloride whereby polymer 43 shown in formula C58 was obtained.

ITO (indium tin oxide). This substrate was arranged at an inclined angle of 45° to a horizontal plane. It was irradiated with 2 mW/cm² non-polarized light via a quartz plate arranged at an inclined angle of 50° to a horizontal plane, at room temperature for 20 seconds in a perpendicular direction to a horizontal plane, to give an alignment layer. Liquid crystal E7 was charged between two sheets of such alignment layers whereby a TN-type liquid crystal cell of 4.5 μm in thickness was assembled. The driving voltage of this TN-type liquid crystal cell was 2 V, and it was confirmed that there is no defect in alignment over the whole surface of the liquid crystal cell.

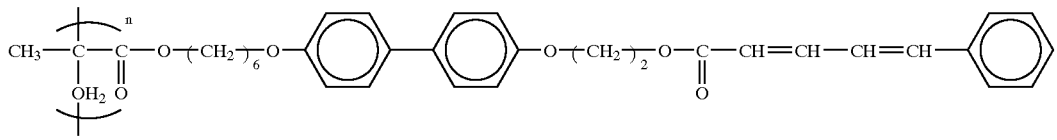

C58

Polymer 44

4-Hydroxy-4'-hydroxyethoxybiphenyl was synthesized by heating 4,4'-biphenyldiol and 2-chloroethanol under alkaline conditions. This product was reacted under alkaline conditions with 1,6-dibromohexane to synthesize 4-(6-bromohexyloxy)-4'-hydroxyethoxybiphenyl. Then, it was reacted with lithium methacrylate to synthesize 4-hydroxyethoxy-4'-(6'-biphenyloxyhexyl)methacrylate. This product was dissolved in tetrahydrofuran, and AIBN (azobisisobutyronitrile) was added thereto as a reaction initiator for polymerization, whereby a polymer having a hydroxyl group at the terminal of its side chain was obtained.

Then, the polymer having a hydroxyl group at the terminal of its side chain was reacted in tetrahydrofuran with α-cyanocinnamylidene acetate chloride synthesized by reacting α-cyanocinnamylidene acetic acid with thionyl chloride whereby polymer 44 shown in formula C59 was obtained.

EXAMPLE 43

Polymer 43 was dissolved in chloroform and spin-coated at a thickness of about 100 nm onto a substrate coated with ITO (indium tin oxide). This substrate was arranged at an inclined angle of 45° to a horizontal plane. It was irradiated with 2 mW/cm² non-polarized light via a quartz plate arranged at an inclined angle of 50° to a horizontal plane, at room temperature for 150 seconds in a perpendicular direction to a horizontal plane, to give an alignment layer. Liquid crystal E7 was charged between two sheets of such alignment layers whereby a TN-type liquid crystal cell of 4.5 μm in thickness was assembled. The driving voltage of this TN-type liquid crystal cell was 2 V, and it was confirmed that there is no defect in alignment over the whole surface of the liquid crystal cell.

EXAMPLE 44

Polymer 44 was dissolved in chloroform and spin-coated at a thickness of about 100 nm onto a substrate coated with

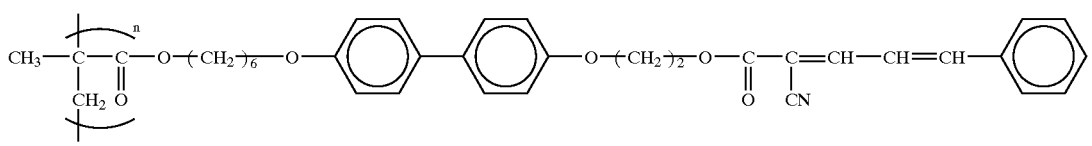

C59

EXAMPLE 41

Polymer 41 was dissolved in chloroform and spin-coated at a thickness of about 100 nm onto a substrate coated with ITO (indium tin oxide). This substrate was arranged at an inclined angle of 45° to a horizontal plane. It was irradiated with 2 mW/cm² non-polarized light via a quartz plate arranged at an inclined angle of 50° to a horizontal plane, at room temperature for 500 seconds in a perpendicular direction to a horizontal plane, to give an alignment layer. Liquid crystal E7 was charged between two sheets of such alignment layers whereby a TN-type liquid crystal cell of 4.5 μm in thickness was assembled. The driving voltage of this TN-type liquid crystal cell was 2 V, and it was confirmed that there is no defect in alignment over the whole surface of the liquid crystal cell.

EXAMPLE 42

Polymer 42 was dissolved in chloroform and spin-coated at a thickness of about 100 nm onto a substrate coated with ITO (indium tin oxide). This substrate was arranged at an inclined angle of 45° to a horizontal plane. It was irradiated with 2 mW/cm² non-polarized light via a quartz plate arranged at an inclined angle of 50° to a horizontal plane, at room temperature for 100 seconds in a perpendicular direction to a horizontal plane, to give an alignment layer. Liquid crystal E7 was charged between two sheets of such alignment layers whereby a TN-type liquid crystal cell of 4.5 μm in thickness was assembled. The driving voltage of this TN-type liquid crystal cell was 2 V, and it was confirmed that there is no defect in alignment over the whole surface of the liquid crystal cell.

Although the preferable embodiments have been described by reference to the drawings, those skilled in the art will easily understand various modifications and changes, within the framework of obviousness. Accordingly, such modifications and changes are construed to be within the scope of this invention defined by the appended claims.

What is claimed is:

1. An alignment layer obtained by applying onto a substrate a homopolymer or copolymer shown in formula C54 with the main chain being at least one of hydrocarbon, acrylate, methacrylate and siloxane, and irradiating said applied polymer with partially polarized ultraviolet light having a completely polarized component mixed with a non-polarized component:

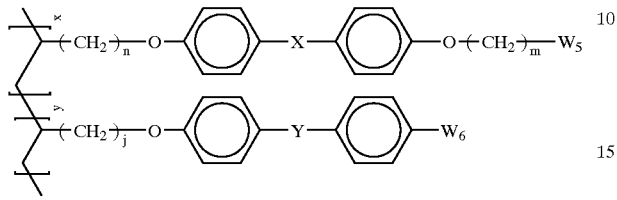

C54 wherein, in formula C54, x:y=100 to 0:0 to 100 whereupon x+y=100; n=1 to 12, m=1 to 12, j=1 to 12; X and Y=a bond, —COO—, —OCO—, —N=N—, —C=C— or —$C_6H_4$—; and W5 and W6 are independently selected from the group consisting of formulae C52 and C53:

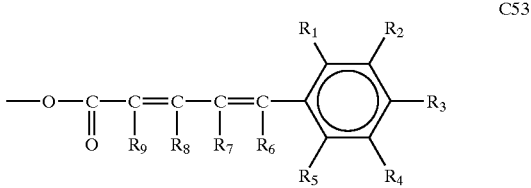

wherein, in formulae C52 and C53, —$R_1$ to $R_9$=—H, halogen group, —CN, or an alkyloxy group.

2. The alignment layer claimed in claim 1, and obtained by irradiating said applied polymer with the partially polarized ultraviolet light in a slanting direction to the direction of a normal line of a substrate.

3. A liquid crystal display endowed with liquid crystal alignment by said applied alignment layer claimed in claim 1.

* * * * *